United States Patent
Skobov

(10) Patent No.: US 10,956,514 B2
(45) Date of Patent: Mar. 23, 2021

(54) SYSTEM AND METHOD FOR DIRECTED ANALYSIS OF CONTENT USING ARTIFICAL INTELLIGENCE FOR STORAGE AND RECALL

(71) Applicant: Microsoft Technology Licensing, LLC, Redmond, WA (US)

(72) Inventor: Mikhail Skobov, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 270 days.

(21) Appl. No.: 15/610,432

(22) Filed: May 31, 2017

(65) Prior Publication Data

US 2018/0349497 A1 Dec. 6, 2018

(51) Int. Cl.
*G06F 16/22* (2019.01)
*G06F 16/951* (2019.01)
*G06F 16/248* (2019.01)
*G06F 16/2455* (2019.01)
*G06F 16/9035* (2019.01)

(52) U.S. Cl.
CPC ............ *G06F 16/951* (2019.01); *G06F 16/22* (2019.01); *G06F 16/248* (2019.01); *G06F 16/2455* (2019.01); *G06F 16/9035* (2019.01)

(58) Field of Classification Search
CPC .... G06F 16/951; G06F 16/22; G06F 16/9035; G06F 16/2455; G06F 16/248
See application file for complete search history.

(56) References Cited

U.S. PATENT DOCUMENTS

| | | | |
|---|---|---|---|
| 6,560,589 B1 * | 5/2003 | Stier | G06N 5/022 706/50 |
| 7,730,009 B1 * | 6/2010 | Higgins | G06N 5/02 706/50 |
| 8,359,319 B2 | 1/2013 | Pendse | |

(Continued)

FOREIGN PATENT DOCUMENTS

WO   2015065225 A1   5/2015

OTHER PUBLICATIONS

Preetha, et al., "Personalized Search Engines on Mining User Preferences Using Clickthrough Data", In Proceedings of IEEE International Conference on Information Communication and Embedded Systems, Feb. 27, 2014, 6 pages.

*Primary Examiner* — Tarek Chbouki
(74) *Attorney, Agent, or Firm* — Fiala & Weaver P.L.L.C.

(57) ABSTRACT

Methods for directed analysis of content for storage and recall are performed by systems and apparatuses. The methods optimize search operations for content using a user-driven knowledge bank. A user selects content that is relevant or important to the user for addition to the knowledge bank, and content information about the content is determined based on user importance and context, and is also stored in the knowledge bank. Subsequent searches for the content by the user are optimized based on the content information improving accuracy of search results for the content based on more general queries and searches by the user, including natural language queries and searches. Searches and queries are performed via search engines, as well as digital assistants and search applications of user systems. The content can be added by a user from different applications, and recall of the content from different applications is performed using an API.

20 Claims, 6 Drawing Sheets

(56) References Cited

U.S. PATENT DOCUMENTS

| | | |
|---|---|---|
| 9,471,638 B2 | 10/2016 | Roytman et al. |
| 9,646,260 B1* | 5/2017 | Tunstall-Pedoe ....... G06F 17/27 |
| 2002/0169771 A1* | 11/2002 | Melmon ................. G06F 16/93 |
| 2004/0088300 A1* | 5/2004 | Avery ................. G06F 9/45512 |
| 2006/0036563 A1* | 2/2006 | Wu ........................ G06N 5/022 |
| | | 706/59 |
| 2006/0184516 A1* | 8/2006 | Ellis ..................... G06F 16/951 |
| 2008/0222103 A1* | 9/2008 | Zhang .................. G06F 16/957 |
| 2010/0070448 A1* | 3/2010 | Omoigui ........... H01L 27/14647 |
| | | 706/47 |
| 2010/0169299 A1* | 7/2010 | Pollara ................. G06F 17/277 |
| | | 707/708 |
| 2010/0228693 A1* | 9/2010 | Dawson ............. G06F 17/2705 |
| | | 706/12 |
| 2011/0289076 A1 | 11/2011 | Boyle et al. |
| 2012/0192258 A1* | 7/2012 | Spencer ................ H04W 12/06 |
| | | 726/7 |
| 2012/0323876 A1 | 12/2012 | Lymberopoulos et al. |
| 2013/0151532 A1* | 6/2013 | Hoyer ................... G06F 16/285 |
| | | 707/740 |
| 2013/0262104 A1* | 10/2013 | Makhija ................. G10L 15/26 |
| | | 704/235 |
| 2013/0290322 A1* | 10/2013 | Prosnitz ................ G06F 16/252 |
| | | 707/723 |
| 2013/0339334 A1 | 12/2013 | Brown et al. |
| 2014/0040231 A1 | 2/2014 | Lin |
| 2014/0114715 A1* | 4/2014 | Kavanagh ...... G06Q 10/063114 |
| | | 705/7.15 |
| 2014/0208220 A1* | 7/2014 | Watal ................... G06Q 10/101 |
| | | 715/738 |
| 2014/0278813 A1* | 9/2014 | Grosset ............. G06F 16/24578 |
| | | 705/7.36 |
| 2014/0344266 A1 | 11/2014 | Bennett et al. |
| 2016/0217381 A1* | 7/2016 | Bloomquist .............. G06N 5/02 |
| 2016/0275261 A1* | 9/2016 | Velamuri ................ G16H 50/20 |
| 2016/0337441 A1* | 11/2016 | Bloomquist ........... G06Q 10/06 |
| 2016/0342695 A1 | 11/2016 | Lawrence |
| 2017/0060913 A1* | 3/2017 | Kjeilen-Eilertsen ..... G06N 5/00 |
| 2017/0076226 A1* | 3/2017 | Allen ...................... G06N 5/04 |

* cited by examiner

SYSTEM AND METHOD FOR DIRECTED ANALYSIS OF CONTENT USING ARTIFICAL INTELLIGENCE FOR STORAGE AND RECALL

BACKGROUND

The amount of data and information a user of electronic devices comes across in a given day continues to increase. While users have adapted to the vast and increasing amounts of data and information they encounter by using storage tools such as OneNote® from Microsoft Corporation of Redmond, Wash., or Evernote® from Evernote Corporation of Redwood City, Calif., for copying data and information, or by using favorites or subject-specific folders, the retrieval and recall of data and information still results in long search times, poor results, and fallback to using search engines.

Many standard searches for information and data lack contextual information to provide requisite search specificity desired by users. Additionally, overhead for maintaining folders and emails marked by users is costly, and such maintenance still provides inefficient searches for specific information that results in false positive search hits, e.g., based on keyword searches.

SUMMARY

This Brief Summary is provided to introduce a selection of concepts in a simplified form that are further described below in the Detailed Description. This Brief Summary is not intended to identify key features or essential features of the claimed subject matter, nor is it intended to be used to limit the scope of the claimed subject matter.

Methods, systems, and apparatuses for directed analysis of content for storage and recall are provided. For example, methods may be performed in server computers and/or computing devices of users, that are communicatively coupled together. In one example, a system is provided. The system may include a memory(ies) configured to store a knowledge bank and program instructions for analyzing content and search recall. The system also includes a processor(s) configured to execute the program instructions stored in the memory(ies). The program instructions may include content capture instructions configured to accept content selected by a user, from each of a plurality of disparate applications of the system, that is indicated by the user for addition to at least one of a local knowledge bank or a remote knowledge bank. Content analysis instructions may also be included that are configured to analyze the content and data associated with the content to determine content information and/or store content information about the content in one or more of the local knowledge bank or a remote knowledge bank. The program instructions may also include recall instructions configured to provide an indication of the content to a user based on the content information responsive to a user query. The program instructions may further include application programming interface (API) instructions configured to interface with the plurality of disparate applications.

In another example, a system is provided. The system includes a memory(ies) configured to store a knowledge bank and program instructions for analyzing content and search recall. The system also includes a processor(s) configured to execute the program instructions stored in the memory(ies). The program instructions include content analysis instructions configured to analyze content selected by a user, from each of a plurality of disparate applications of the system or one or more remote systems, that is indicated by the user via a user interface, for storing in the knowledge bank, and analyze data associated with the content to determine content information associated with the content, and configured to store the content information in the knowledge bank. The program instructions also include recall instructions configured to provide an indication of the content to one of the one or more remote systems for display to the user based on the content information responsive to a user query.

In still another example, a method implemented by a computing system is described. The method includes analyzing a plurality of content items selected by a user, from each of a plurality of disparate applications, respectively, of one or more computing systems, that is indicated by the user for storing in a knowledge bank, and analyzing data associated with each of the plurality of content items. The method also includes determining respective content information associated with each of the plurality of content items, and storing the respective content information in the knowledge bank. The method further includes providing individual indications for each of the plurality of content for display to the user based on the respective content information responsive to associated user queries.

These and other objects, advantages and features will become readily apparent in view of the following detailed description of examples of the invention. Note that the Brief Summary and Abstract sections may set forth one or more, but not all examples contemplated by the inventor(s). Further features and advantages, as well as the structure and operation of various examples, are described in detail below with reference to the accompanying drawings. It is noted that the ideas and techniques are not limited to the specific examples described herein. Such examples are presented herein for illustrative purposes only. Additional examples will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate examples of the present application and, together with the description, further explain the principles of the example embodiments and to enable a person skilled in the pertinent art to make and use the example embodiments.

Figure 1:
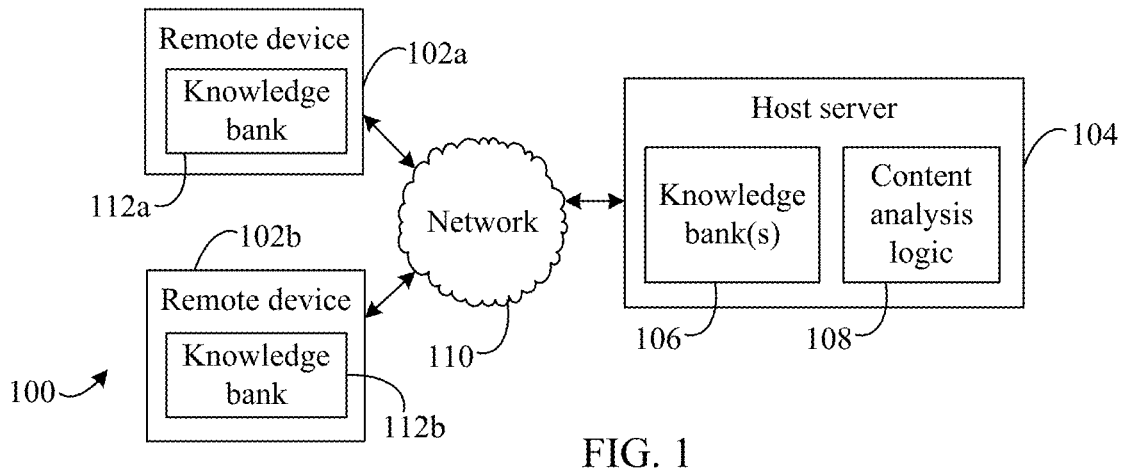
FIG. 1 shows a block diagram of a networked system for directed analysis of content for storage and recall, according to an example embodiment.

The features and advantages of the examples described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous embodiments. The scope of the present patent application is not limited to the disclosed embodiments, but also encompasses combinations of the disclosed embodiments, as well as modifications to the disclosed embodiments.

References in the specification to "one embodiment," "an example embodiment," "an example," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Numerous embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Section II below describes example embodiments for directed analysis of content for storage and recall.

Section III below describes an example mobile device that may be used to implement features of the example described herein.

Section IV below describes an example processor-based computer system that may be used to implement features of the example described herein.

Section V below describes some additional examples and advantages.

Section VI provides some concluding remarks.

II. Example Embodiments

The example techniques and embodiments described herein are provided for illustrative purposes, and are not limiting. The embodiments described herein may be adapted to any type of electronic and/or processing device, as well as systems thereof. Further structural and operational embodiments, including modifications/alterations, will become apparent to persons skilled in the relevant art(s) from the teachings herein.

The techniques and embodiments described herein provide for "knowledge banks" for users of computing systems. A knowledge bank may be a storage system, or portion thereof, that contains content and/or information about the content that is, or was, relevant to the user. Knowledge banks may also comprise deep-links and context(s) for the stored information that allow users to obtain answers to questions they may have, e.g., via queries and searches. A knowledge bank entry may be created in a knowledge bank by user interaction with a system (e.g., via a user interface (UI), such as a right-click menu item or a web-page button) and/or by an external API invocation. The content information of an entry may be determined or generated by artificial intelligence (AI) components based on the current context of content selected by a user and/or by user input. This allows users to search their own knowledge, or items they have seen, without the burden of remembering where the information was obtained, at what time, whom it was sent by, etc. These techniques provide improvements over "favorite-and-forget" interactions by actually producing meaningful results, rather than making the user search for content/results manually.

As an example scenario, assume an email is sent out with the title "Bug: 19308" from Jane on Jan. 5, 2017. The email has information stating that a system component, "X," will not work properly until this bug is fixed, but a workaround is included as an attachment in the email. Conventionally, John would see the email and move it to a folder that includes other information and/or emails (or John may flag the email, favorite the email, etc.). Later, on Jan. 30, 2017, John is encountering the issue with the bug, and he desires to use the workaround from Jane's email. In this example, John must remember if he put the email in a favorites folder, who sent that email, what was that system component affected, etc. Additionally, John must remember that it was an email, not an instant message (IM) or an electronic note (e.g., a OneNote® entry), etc. It may take John an undesired amount of time to find the relevant information he seeks via these conventional methods. For instance, if John remembers only that the communication was from Jane, John must go look through all of the emails Jane sent in the last month, or look through all of the days around when the email was sent. This presents several issues for John around the lack of contextual information in standard searches, overhead maintaining documents, folders, and/or emails, and time spent searching for information, as examples.

According to the embodiments and techniques herein, when John receives the email from Jane, John may right click his mouse in/on the email, selecting it, to display a menu and click "Save to Knowledge Bank" or "Knowledge Bank" or the like. Alternatively, John may select the email and then use a specific keystroke, a button in the email application, a voice activation, stylus or touch, etc., and John's system, implementing the described techniques, processes/analyzes the email from Jane and creates an entry for John's knowledge bank that specifies the selected content is an email, from Jane, on Jan. 5, 2017, about a bug #19308, with keyword "workaround," etc. On Jan. 30, 2017, when John desires to find the workaround for the bug, he may perform a search/query (e.g., by typing "bug workaround component 'X'" into Cortana® from Microsoft Corporation, and is shown a text result with information about Jane's email, a selectable activator that opens Outlook® from Microsoft Corporation and Jane's email for him, and/or the like.

As another example, Mary is a manager and Sam works for Mary. Whenever Sam takes time off, he sends Mary and his team an email with information about when he will be out of the office. Mary noticed that Sam still has a lot of vacation days left and wants to know how many days Sam took off in the current year. If Mary initially anticipates such a need for information, she moves out of office emails from Sam to a folder for "OOF time," that may also contain emails from her other direct reports about their time off. Mary then must scan through all emails, after being sorted to show emails from Sam, and count the days manually. Alternatively, Mary may scan each email, and update a spreadsheet in Excel® from Microsoft Corporation. As similarly noted above, this presents several issues for Mary around the lack of contextual information in standard searches. For instance, if Sam does not use "out of office" or an appropriate abbreviation in his email and Mary overlooks it or does not place it in a specific folder, time spent searching for information may not lead to productive findings, as an example. Additionally, even if Mary stored the email in a folder, the overhead for maintaining documents, folders, and/or emails is detrimental to system storage, as well as Mary's search time to navigate to the folder and then search through it.

According to the embodiments and techniques described herein, when Mary sees an email with "out of office" or an appropriate abbreviation in the subject, she right clicks on the email, and saves it to her knowledge bank. Alternatively, Mary may select the email and then use a specific keystroke, a button in the email application, a voice activation, inputs via stylus or touch, etc., and Mary's system, implementing the described techniques, processes/analyzes the email from Sam and creates an entry for Mary's knowledge bank. When Mary's system processes/analyzes the emails according to embodiments described herein, the system recognizes that "OOF" or the like in the subject is associated with "I will be out of the office" in the Sam's email content. If Sam does not include an appropriate indication for being out to the office in the subject of his email, the content of the body of the email, as indicating being out of the office, may still be associated with these types of emails based on context. If Mary subsequently wants to see how many days Sam took off in the current year; Mary can type "when was Sam gone this year," for example, and Mary's system provides Sam's "OOF" emails and/or shows Mary information regarding the dates Sam was not in the office.

Moreover, a search in a conventional search engine for the word "bubble," yields essentially random results: bubble tea, the definition of the word "bubble," images for bubbles, etc. These results can be improved by observing additional searches performed by the user, e.g., a search for "merge sort," then "radix sort", deriving a context associated with those searches and then using that context to better refine the search results for the search based on the word "bubble." For example, after these searches are observed, a subsequent search by the same user that starts by typing "bubble" may then yield a first result that is "Bubble Sort," as opposed to the initial uncorrelated search results.

According to the embodiments and techniques herein, a knowledge graph is introduced by the knowledge bank that can increase search efficiency and product results. For instance, Bing® from Microsoft Corporation can predict desired results without the user having to perform any initial searches. If the user saved an email related to an algorithms class to their knowledge bank, or saved a line of text from a Wikipedia article on a "merge sort" webpage to their knowledge bank, and/or saved other content/information to their knowledge bank that indicates the user may be interested in computer code, rather than tea or images of bubbles, Bing® searches may be improved through utilization of the stored content/information in the knowledge bank. That is, in this case, when the user types "bubble" into the search field of Bing®, the search engine can automatically bring up a "bubble sort" Wikipedia article, for example, rather than the nearest "bubble tea location" based on the user having previously indicated content in the context of computers/programming was important or relevant to the user.

In embodiments, a user may have a specific login alias or credentials for systems and/or services of providers, e.g., systems and services provided by Microsoft Corporation. The techniques herein allow for knowledge bank utilization across all available systems and services to which a user has permission/access when the user is logged in with their credentials to one service or service. For example, if a user is logged in to her Outlook® account and then performs a search using Bing®, her login credentials may be recognized by the search engine and access to her knowledge bank may be used for the search.

The techniques and embodiments described herein provide for directed analysis of content for storage and recall using user-driven knowledge banks. In embodiments, search operations for content are optimized using a user-driven knowledge bank. A user selects content that is relevant or important to the user for addition to the knowledge bank, and content information about the content is determined based on user importance and context of the content, and is also stored in the knowledge bank. Subsequent searches for the content by the user are optimized based on the content information improving accuracy of search results for the content even when general queries and searches are performed by the user, including natural language queries and searches. Searches and queries may be performed via search engines, as well as digital assistants and search applications of user systems, according to embodiments. The content and content information can be added to a knowledge bank by a user from different, disparate applications, webpages, etc., and acquisition and/or recall of the content from different applications and webpages may be performed using an API.

In a search for content specific to a user, a conventional search tool or engine does not know, and cannot anticipate, a user's desire for particular content unless the user provides such specificity in the search criteria. Without such specificity, the usefulness of search results is greatly diminished. The example embodiments and techniques described herein enable efficient, yet improved, directed analysis of content for storage and recall. The described embodiments and techniques provide for directed analysis of content for storage and recall via user-driven knowledge banks. A "host server" as referred to herein comprises one or more server computers or computing devices configured to receive content selected by users, or indicia thereof, and analyze this content to determine content information related to the content for efficient recall. "Remote devices" are considered to be any type of computing devices configured to execute software components or entities which provide for selection of content to be added to knowledge banks and analyze this content to determine content information related to the content for efficient recall, such as but not limited to, devices in the cloud, client computers like desktops, workstations, laptops, etc., mobile/personal devices, and/or the like.

Systems and devices may be enabled in various ways for directed analysis of content for storage and recall using user-driven knowledge banks. For example, FIG. 1 is a block diagram of a system 100 system for directed analysis of content for storage and recall using user-driven knowledge banks, according to an embodiment. As shown in FIG. 1, system 100 includes a remote device 102*a*, a remote device 102*b*, and a host server 104, which may communicate over a network 110. It should be noted that the number of remote devices and host servers is exemplary in nature, and may include more or fewer of each in various embodiments.

Remote device 102*a*, remote device 102*b*, and a host server 104 are configured to be communicatively coupled via network 110. Network 110 may comprise any type of connection(s) that connects computing devices and servers such as, but not limited to, the Internet, wired or wireless networks and portions thereof, point-to-point connections, local area networks, enterprise networks, and/or the like.

Remote device 102*a* and remote device 102*b* may be any type of computing device or computing system, including a terminal that may be used to execute software applications and user interfaces. Remote device 102*a* includes a knowledge bank 112*a*, and remote device 102*b* includes a knowledge bank 112*b*. Remote device 102*a* and remote device 102*b* are configured to allow users to add user-selected content or portions of content, from different sources, such as but not limited to applications, webpages, etc., to knowledge banks, as described herein. Remote device 102*a* and remote device 102*b* are also configured to allow users to later recall the content and/or search for related content based on a user query and in a manner that automatically utilizes the content information. In embodiments, remote device 102*a* and/or remote device 102*b* may include an instance of content analysis logic 108.

Host server 104 may comprise one or more server computers and may be one or more distributed or "cloud-based" servers. Host server 104 is configured to receive user-selected content and/or content information from remote device 102*a* and/or remote device 102*b* via network 110. In embodiments, host server 104 is configured to provide recalled content or search results to remote device 102*a* and/or remote device 102*b* via network 110. As illustrated, host server 104 includes a knowledge bank(s) 106 and content analysis logic 108.

Knowledge bank(s) 106, knowledge bank 112*a*, and knowledge bank 112*b* (collectively referred to herein as "knowledge banks") are configured to store user-selected content (or portions thereof) and content information for recall functions, e.g., responsive to user searches and/or queries. Knowledge banks are also configured to indexed the stored information and data based on the user-selected content for more efficient storage and recall. Knowledge bank 112*a* and knowledge bank 112*b* may be "local" knowledge banks for user computing systems (i.e., remote device 102*a* and/or remote device 102*b*) that act as caches for content and/or content information that is deemed to be of significant importance to the user (e.g., temporally (including frequency), substantively, based on location, etc.) as described herein.

Content analysis logic 108 is configured to determine information and data associated with the content (i.e., the content information) to be associated with the content in the knowledge banks. The content information may include without limitation one or more of an application name, a name of a person, a date, a time, a context, metadata, or a keyword(s).

Accordingly, host server 104 is configured to utilize content analysis logic 108 and knowledge bank(s) 106 for directed analysis of content for storage and recall.

Figure 2:
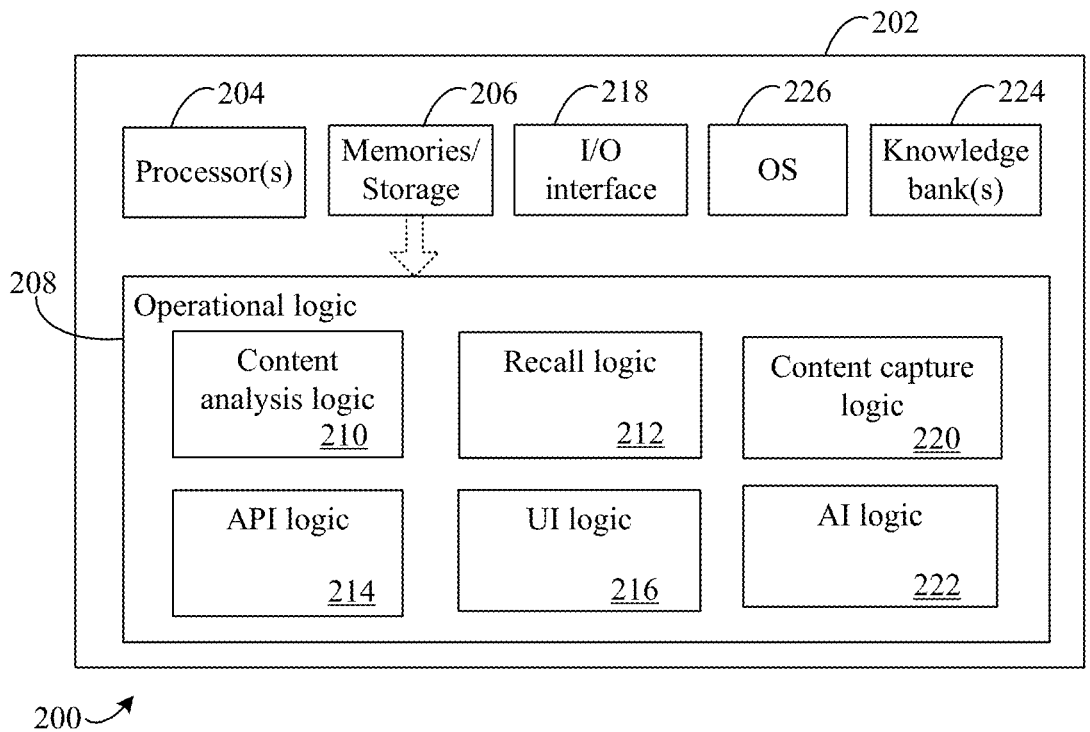
FIG. 2 shows a block diagram of a system for directed analysis of content for storage and recall, according to an example embodiment.

FIG. 2 is a block diagram of a system 200, according to an embodiment. System 200 may be a computing system for directed analysis of content for storage and recall using user-driven knowledge banks, in embodiments. As shown in FIG. 2, system 200 includes a computing device 202 which may be referred to as a computing system. System 200 may be a further embodiment of system 100 of FIG. 1, and computing device 202 may be a further embodiment of host server 104, remote device 102*a*, and/or remote device 102*b* of FIG. 1. Computing device 202 may be any type server computer or computing device, as mentioned elsewhere herein, or as otherwise known. As shown in FIG. 2, computing device 202 includes one or more of a processor ("processor") 204, one or more of a memory and/or other physical storage device ("memory") 206, an input/output (I/O) interface 218, an operating system (OS) 226, a knowledge bank(s) 224 which may be a further embodiment knowledge bank(s) 106, knowledge bank 112*a*, and/or knowledge bank 112*b* of FIG. 1, and operational logic 208. System 200 may also include additional components (not shown for brevity and illustrative clarity) such as, but not limited to, those described below with respect to FIGS. 11 and 12.

Processor 204 and memory 206 may respectively be any type of processor or memory that is described herein, or as would be understood by a person of skill in the relevant art(s) having the benefit of this disclosure. Processor 204 and memory 206 may each respectively comprise one or more processors or memories, different types of processors or memories, and/or distributed processors or memories. Processor 204 is configured to execute computer program instructions such as but not limited to operational logic 208, e.g., computer program instructions for directed analysis of content for storage and recall, etc., as described herein, and memory 206 is configured to store such computer program instructions, as well as to store other information and data described in this disclosure, including but without limitation, knowledge bank(s) 224.

I/O interface 218 may be any type of wired and/or wireless network adapter, modem, etc., configured to allow computing device 202 to communicate with other devices over a network, e.g., such as communications between host server 104, remote device 102*a* and/or remote device 102*b* described above with respect to FIG. 1.

OS 226 that may be any operating system used by computing devices described herein such as, but without limitation, Microsoft® Windows® from Microsoft Corporation of Redmond, Wash., OS X® from Apple, Inc. of Cupertino, Calif., UNIX® from The Open Group, and/or the like. In embodiments, OS 226 may be accessed by a remote device or host server via a network connection to a server (e.g., remote devices 102*a*/102*b* and/or host server 202) where such devices operate as workstations or terminals, and/or the like.

Knowledge bank(s) 224 may comprise content (also referred to herein as "content items") as well as data and information, e.g., content information, associated with the content. In embodiments, the data and information may include, without limitation, an application name, a name of a person, a date, a time, a context, metadata, keywords, etc., as described herein. Knowledge bank(s) 224 may be configured in various ways, such as but not limited to, databases, storage arrays, and/or data stores, e.g., cloud storage, and may be associated with online or "cloud" services for implementing/performing the techniques and embodiments herein. Knowledge bank(s) 224 may be configured as local databases on user computing systems such as remote device 102a and/or remote device 102b of FIG. 1.

In embodiments, knowledge bank(s) 224 may be stored in a portion of memory 206, and the data and information stored in knowledge bank(s) 224 may be indexed according to content items, content information, etc.

Operational logic 208, as illustrated, includes a plurality of components for performing the techniques described herein for directed analysis of content for storage and recall using user-driven knowledge banks. As shown, operational logic 208 includes content analysis logic 210 that may be an embodiment of content analysis logic 108 of FIG. 1, recall logic 212, API logic 214, UI logic 216, content capture logic 220, and artificial intelligence (AI) logic 222. While shown separately for illustrative clarity, in embodiments, one or more of content analysis logic 210, recall logic 212, API logic 214, UI logic 216, content capture logic 220, or AI logic 222 may be included together with each other and/or as a part of operational logic 208.

API logic 214 is configured to interface with diverse and unrelated applications, as described herein, that execute on computing systems (e.g., any application). For example, API logic 214 may be configured to interface with email applications, web browsers, file browsers, productivity applications, media/multi-media applications, messaging applications, an OS, and/or the like, including any files, data, information and/or content associated therewith. In embodiments, API logic 214 may be utilized by one or more components of the systems described herein, e.g., system 100 of FIG. 1, system 200 of FIG. 2, and/or system 700 of FIG. 7 described below, in accessing and recalling content and content information to/from applications and their associated files, data, information, etc. That is, API logic 214 is configured to allow operational logic 208 to interface with any applications executing on a processing system to perform the embodiments and techniques described herein. It should also be noted that API logic 214 may also be invoked by applications external to operational logic 208, according to the embodiments and techniques described herein.

Figure 3:
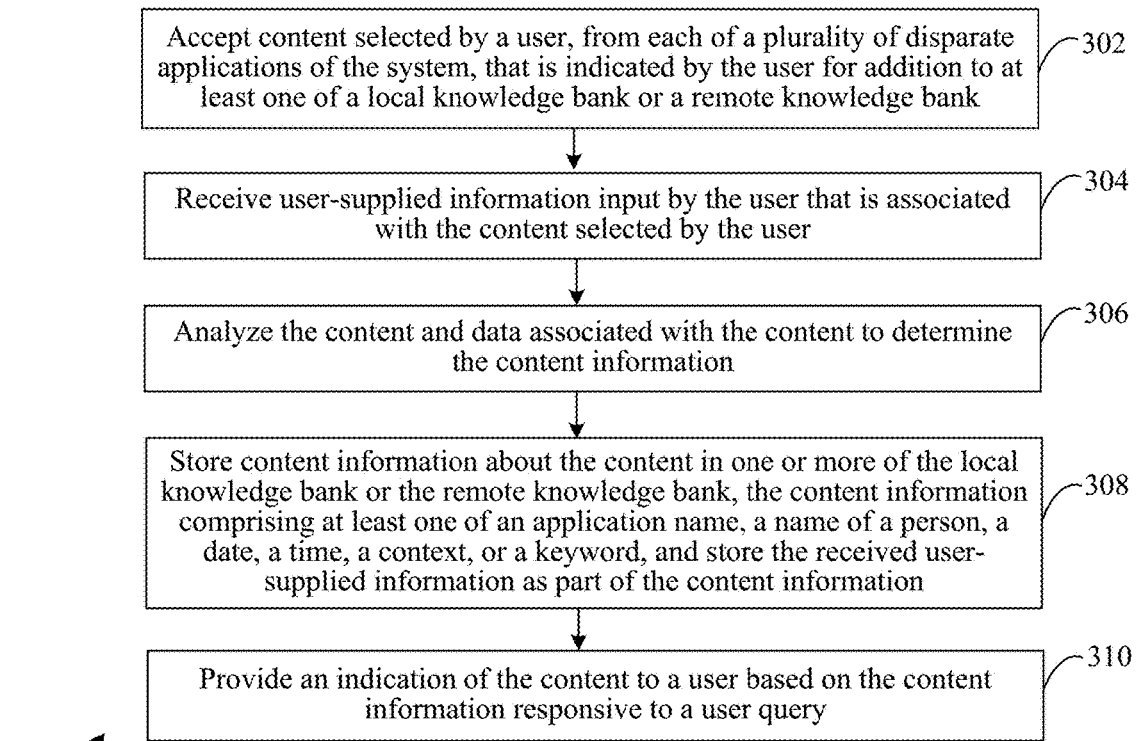
FIG. 3 shows a flowchart for directed analysis of content for storage and recall, according to an example embodiment.

Referring also now to FIG. 3, a flowchart 300 for directed analysis of content for storage and recall is shown, according to an example embodiment. For purposes of illustration, flowchart 300 of FIG. 3 is described with respect to system 200 of FIG. 2 and its subcomponents, and also with reference to FIGS. 4 and 5 (described below). That is, system 200 of FIG. 2 may perform various functions and operations in accordance with flowchart 300 for directed analysis of content for storage and recall with regard to content selection/storage and recall between host server 104, remote device 102a and/or remote device 102b of system 100 in FIG. 1. Further structural and operational examples will be apparent to persons skilled in the relevant art(s) based on the following description.

Figure 4:
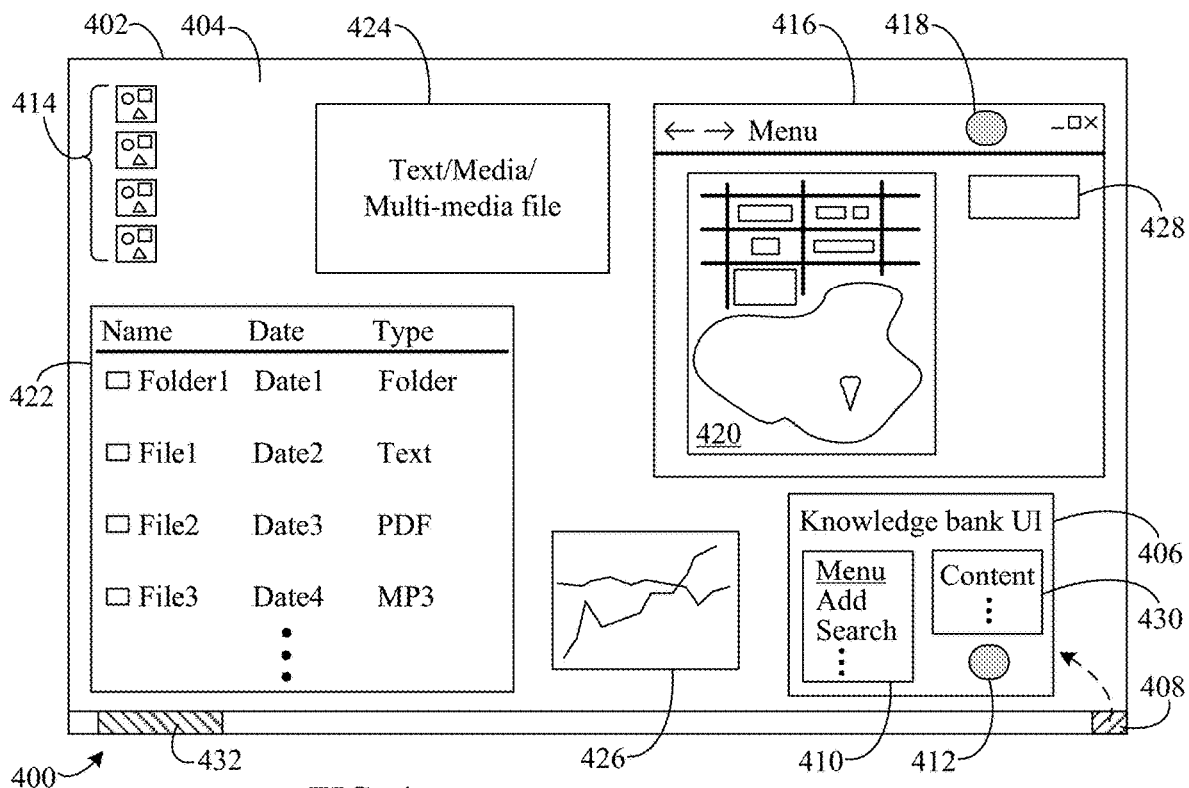
FIG. 4 shows a block diagram of a system with a display and user interfaces for directed analysis of content for storage and recall, according to an example embodiment.

In FIG. 4, a block diagram of a system 400 and user interfaces for directed analysis of content for storage and recall is shown, according to an example embodiment. System 400 includes a display 402, e.g., a monitor, television, etc., with a UI 404 that may be a UI of an OS such as OS 226. In embodiments, OS 226 may include an interface 432 for a digital personal assistant, such as Cortana®, that is accessible via UI 404. Within UI 404 example content that may be selected by a user for addition to a knowledge bank (e.g., knowledge bank(s) 224 of FIG. 1) are illustrated.

Icons 414 may be icons representative of files, folders, shortcuts, etc. A web browser UI 416 is also shown having a map 420 presented therein. Web browser UI 416 may include a field 428 for the entry of queries or searches by a user for a web-based search engine such a Bing®, and may include a selectable button 418 for adding selected content to knowledge bank(s) 224. A file browser UI 422 is also illustrated having an example folder and example files. Selecting an example file from file browser UI 422 may cause information associated with the file to be displayed to the user as shown according to file 424 which may be any type of file including but not limited to text files (e.g., documents, program source code, etc.), media files (pictures, audio files, etc.), multi-media files (e.g., videos), and/or the like, having content therein that a user may select (or select a portion thereof).

Also illustrated on display 402 of system 400 is a knowledge bank UI 406. Knowledge bank UI 406 may be a component of OS 226, or may be a stand-alone application executing on system 400. In embodiments, knowledge bank UI 406 may reside as shown in FIG. 4, while in other embodiments, knowledge bank UI 406 may be minimized or hidden until activated by a selectable control 408. Knowledge bank UI 406 may be provided by executing UI logic 216 of FIG. 2 on processor 204. Knowledge bank UI 406 may include a search results field 430 (described in further detail below) and a menu 410. Menu 410 may include a selectable option to add content to knowledge bank(s) 224, according to embodiments, and an option for content searches (described in further detail below). Knowledge bank UI 406 may also include a selectable button 412 to add selected content to knowledge bank(s) 224, according to some embodiments. It is also contemplated herein that for some embodiments, selected content may be dragged and dropped (i.e., a drag-and-drop operation) into knowledge bank UI 406 and/or into selectable control 408 to add the selected content to knowledge bank(s) 224.

Figure 5:
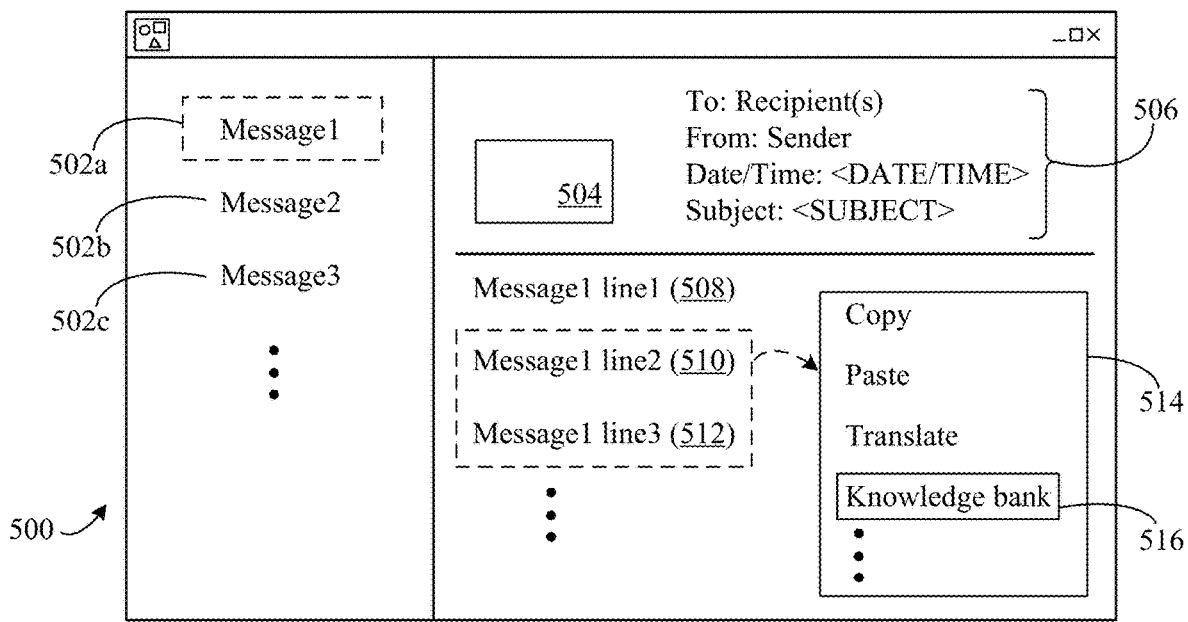
FIG. 5 shows a block diagram of an application user interface and menu for directed analysis of content for storage and recall, according to an example embodiment.

In FIG. 5, a user interface (UI) 500 for an application and a menu for directed analysis of content for storage and recall is shown, according to an example embodiment. UI 500, as shown for exemplary illustration and discussion, is for an electronic mail program such as Outlook®, although UIs for any other type of application and/or content are contemplated in embodiments. A plurality of electronic mails ("emails"), message1 502a, message2 502b, message3 502c, are illustrated though any number of electronic mails are contemplated herein. Message 502a is shown as highlighted from selection by a user to view this email. When selected, the header and body of message1 502a is displayed to the user, in embodiments. For instance, header information 506 is shown as including fields for a sender, a recipient(s), a date and/or time, and a subject for the email. In embodiments, emails may include attachments such as attachment 504. The body of message1 502a includes a plurality of lines of text: line1 508, line2 510, line 3 512, etc., although any number of lines (including zero), and other types of information within an email body, are contemplated herein.

Flowchart 300 is described as follows.

In step 302, content selected by a user, from each of a plurality of disparate applications of the system, that is indicated by the user for addition to at least one of a local knowledge bank or a remote knowledge bank is accepted.

For example, content capture logic 220 may be configured to accept content selected by a user of a computing device. According to embodiments, content capture logic 220 may receive the content selected by the user via API logic 214 in performance of operations described herein. In embodiments, selected content or indicia thereof may be temporarily stored in memory 206 until added to knowledge bank(s) 224 through actions of the user, as described herein. Additionally, the accepted content or indicia thereof may be displayed to the user via knowledge bank UI 406 when accepted. The content may be content from one or more of a plurality of disparate applications executing on a device of the client (e.g., remote device 102*a* and/or remote device 102*b* of system 100 in FIG. 1, or computing device 202 of system 200 in FIG. 2). Content may be selected by a user via input devices (e.g., a mouse, a stylus, a keyboard, a touchscreen, a microphone, a video camera, etc.). The user may desire that the selected content be added to knowledge bank(s) 224.

For instance, icons 414 may be icons representative of files, folders, shortcuts, etc., that a user may select. A web browser UI 416 is also shown having a map 420 presented therein. Web browser UI 416 may include a field 428 for the entry of queries or searches by a user for a web-based search engine such a Bing®, and may include a selectable button 418 for adding selected content to knowledge bank(s) 224. Map 420, or a portion thereof, may be selected by a user prior to activating button 418 to be able to add map 420, or the portion thereof, to knowledge bank(s) 224. That is, a user may select the entire map 420, a building, residence, business, road, intersection, park, map labels/identifiers, and/or the like from map 420. The folder and files shown in file browser UI 422 may be selected by a user in their entirety as a file, and may include a field (not shown) for the entry of queries or searches by the user.

As noted above, portions of content, or the entirety of the content, may be selected by a user for addition to a knowledge bank. For instance, a file for a Microsoft® Word document may be opened in display 402 by the user. The user may desire to only add a specific portion of the document, e.g., a relatively small number of lines, to knowledge bank(s) 224 because that portion of the document is especially relevant and/or important to the user. The user may thus only select the specific portion of the document to be added to knowledge bank(s) 224. A user may also select content from productivity documents 426 (graphical data representations, presentations, data, other information, etc.). It should be noted that any content described and/or contemplated herein may be displayed via a respective UI on display 402 of system 400.

In an example embodiment, to be able to add content to knowledge bank(s) 224, a user may select one of icons 414, a file(s) and/or a folder(s) of file browser 422 and then select the add option from menu 410, or activate button 412, of knowledge bank UI 406. Similarly, a user may drag-and-drop one of icons 414, a file(s) and/or a folder(s) of file browser 422 into knowledge bank UI 406 or selectable control 408 to be able to add the content to knowledge bank(s) 224. It is also contemplated herein that content selected by a user from within a UI that has a selectable button, such as button 418, for adding content to a knowledge bank, may also be added to the knowledge bank via knowledge bank UI 406 and/or selectable control 408, as described herein, or via voice activated command.

Referring to FIG. 5, for discussion of this embodiment, line2 510 and line3 512 of message1 502*a* are shown as having been selected by the user for addition to knowledge bank(s) 224 by using a mouse, one or more keyboard strokes, voice commands, etc. However, it is contemplated herein that any portions of an email message may be selected by a user for addition to a knowledge bank, such as, but not limited to, attachment 504, any portion of header information 506, etc. Likewise, a user may select the indication of message1 502*a* in the left pane, as shown, for addition to a knowledge bank.

In step 304, user-supplied information input by the user that is associated with the content selected by the user is received. For instance, content capture logic 220 may be configured to receive and accept user-supplied information that is associated with the selected content. In embodiments, the user-supplied information associated with the selected content may be provided by the user via a mouse, one or more keyboard strokes, voice commands, etc., and may include copy-and-paste and/or drag-and-drop data provided by the user to knowledge bank UI 406. The user-supplied information may include keywords, names of persons associated with the selected content, context information relevant to the selected content, data and information from other applications or other content, a past or future date/time, an indication of importance to the user, and/or the like.

In some embodiments, the user may be prompted via knowledge bank UI 406 or other pop-up menu or UI (not shown) to provide the user-supplied information.

In step 306, the content and data associated with the content is analyzed to determine the content information. For example, content analysis logic 210 may be configured to analyze the selected content and other associated data, including metadata, surrounding content (e.g., information in a document that was not selected by a user, header information of an email, etc.), and the user-supplied information from step 304, to determine the content information. In determining the content information, portions of content, associated data, and user-supplied information may be identified as important based on contextual analysis, content associations and/or similarities, knowledge of generalized topics, and/or the like. In some embodiments, determinations are made utilizing a database of information (not shown) stored in memory 206, on a server of network 110 of FIG. 1, or "in the cloud," and which may be stored in association with knowledge bank(s) 224. Determinations may also be made based on content and/or content information previously stored in knowledge bank(s) 224. It is also contemplated herein that content information or portions thereof may be generated by content analysis logic 210. In embodiments, the content information may comprise, without limitation, one or more of an application name, a name of a person, a date, a time, a context, or a keyword.

According to embodiments, content analysis logic 210 may utilize API logic 214 in performance of operations described herein. AI logic 222 may also be utilized by, or be a portion of, content analysis logic 210 to analyze the content and data associated with the content. In embodiments, AI logic 222 may employ machine learning and association algorithms to determine content information, and AI logic 222 may be utilized to generate content information or portions thereof based on AI learning techniques and/or algorithms, e.g., based on contextual analysis, content associations and/or similarities, knowledge of generalized topics, and/or the like.

For instance, in the example email message described above with respect to FIG. 5, message1 502*a*, line1 508 may be a greeting, while line2 510 and line3 512 include information about a recent online purchase, e.g., an item and an invoice number. If the subject includes words such as "purchase" or the seller, content analysis logic 210 and/or AI logic 222 are configured to associate the item and invoice number and/or the seller. If similar or other online purchases have been made in the past by the user, the pattern of purchases, the format of the email, and/or the like, may be recognized by content analysis logic 210 and/or AI logic 222 to associate selected line2 510 and line3 512 with an online purchase. Accordingly, content analysis logic 210 and/or AI logic 222 determines that for an online purchase, content information should include the seller and/or the sender of the email message, the date/time, the invoice number, any description of the purchased item, etc. In some embodiments, a user may have a specific login alias or credentials for certain websites that are included in the "To" field for the recipient or in the body of the email message. Content analysis logic 210 and/or AI logic 222 are configured to learn to associate such identifiers with online purchases and thus "online purchase" may be included in the content information based on this association with the content itself. Similarly, when the user selects content from an email message, content analysis logic 210 and/or AI logic 222 may include the name of the email application, e.g., Outlook®, in the content information.

Likewise, with respect to system 400 of FIG. 4, metadata associated with icons 414 and/or file 424 may be stored as content information when one or more of icons 414 or file 424, or a portion thereof, is selected by the user for addition to knowledge bank 224. Content information for content in file browser 422 may be similarly determined. As an example, if a file of file browser 422 is selected by the user, the folder name in which the file resides may be included in the content information, as well as a file type. In embodiments, content analysis logic 210 and/or AI logic 222 may be configured to associate file name extensions and/or file types with user-supplied information, applications, topics/contexts, and/or the like for inclusion in content information. Additionally, specific types of files, or portions thereof, may be associated with identifiers that encompass them, and such identifiers may be included in the content information. For instance, if a user selects a line of code from a source code file having a ".cpp" or a ".cs" file extension, content analysis logic 210 and/or AI logic 222 may include a tag such as "programming" in the content information. If the user also selects content from a webpage tutorial for software development for a knowledge bank, such as for Visual Studio® from Microsoft Corporation, .a "programming" tag may be included in the content information by content analysis logic 210 and/or AI logic 222. Such tags may be used for indexing and searching of content as described herein.

The example for map 420 above may also be extended with respect to step 306. For example, when a user selects an item from map 420, nearby items such as businesses, attractions, roads, intersections, etc., may be determined by content analysis logic 210 and/or AI logic 222 for inclusion in context information. In an example scenario, the user may notice a restaurant on map 420 that is near their place of work. The user may select the restaurant on map 420 and to add the restaurant and automatically add content information (location, hours, menu, adjacent streets/intersections, contact information such as phone number, and proximity to the user's place of work) for the restaurant, to knowledge bank(s) 224.

In step 308, content information about the content is stored in one or more of the local knowledge bank or the remote knowledge bank, and the received user-supplied information is stored as part of the content information. The content information may comprise at least one of an application name, a name of a person, a date, a time, a context, or a keyword. For instance, content analysis logic 210, or content capture logic 220, may be configured to store the content information (and/or the content itself) in knowledge bank(s) 224.

Referring also back to FIG. 1, as noted above, a user system such as remote device 102a and/or remote device 102b (e.g., user computing devices or user computing system) includes a local knowledge bank (e.g., knowledge bank 112a and knowledge bank 112b) that may store content and content information for content that is determined or indicated as being of particular importance to the user (e.g., based on temporality (including frequency), location, and/or content). In such cases, search/query results may be returned more quickly from these local knowledge banks, in addition to allowing a user to search for content when the user system is not connected to network 110 or when network 110 is operationally impaired. Knowledge bank 106 of host server 104 in FIG. 1 may also store some or all content and/or content information that is included in knowledge bank 112a or knowledge bank 112b.

As noted above, menu 410 of system 400 in FIG. 4 may include a selectable option to add content to knowledge bank(s) 224, knowledge bank UI 406 may include a selectable button 412 to add selected content to knowledge bank(s) 224, and selected content may be dragged and dropped (i.e., a drag-and-drop operation) into knowledge bank UI 406 and/or into selectable control 408 to add the selected content to knowledge bank(s) 224. The use of selectable menu options and buttons may comprise an action by the user to cause the content information to be stored. In embodiments utilizing drag-and-drop operations, the content information may be automatically stored subsequent to the completion of step 306.

A menu 514 of UI 500 in FIG. 5 may be provided to a user responsive to the user right-clicking their mouse on selected content (e.g., line2 510 and line3 512). As illustrated, menu 514 may include selectable options common or specific to a well-known menu for the application associated with UI 500, such as but not limited to, options for copying, pasting, cutting, translating, etc., in addition to a selectable knowledge bank option 516 for adding selected content to a knowledge bank, while it is also contemplated herein that menu 514 may only include knowledge bank option 516. In embodiments, a combination of keystrokes, voice activation from the user, and/or the like, may be used to invoke menu 514. In some embodiments, a specific combination keystrokes and/or mouse clicks may invoke menu 514.

In step 310, an indication of the content is provided to a user based on the content information responsive to a user query. For example, a user may submit a query or search for content, and recall logic 212 may be configured to provide an indication of the content to the user. The indication may be provided by recall logic 212 based on content information associated with the content that is stored in knowledge bank(s) 224, and may be displayed via results field 430 of knowledge bank UI 406. The indication may comprise the content, a link to the content, a summary of the content, and/or the like. According to embodiments, recall logic 212 may utilize API logic 214 in performance of operations described herein.

As an example, the user may provide a query or search criteria for content previously stored to in knowledge bank(s) 224, as described in step 308, via a selectable search option of menu 410, via interface 432 for a digital personal assistant, via a voice command, via a search component, e.g., a search application, such as but without limitation, a search function of file browser 422, or other similar application, etc. In this example, consider a scenario where the user wishes to know the name of the restaurant as exemplarily described above with respect to step 306, but cannot remember the name of the restaurant or the street on which the restaurant is located. The user may provide search criteria such as "restaurant near work," and a search may be initiated. Because the content information stored in knowledge bank(s) 224 includes the proximity to the user's work location, this association with the restaurant is recognized based on the search criteria, and information regarding the restaurant may be displayed to the user as textual information, on a map, or as a selectable link.

Figure 6:
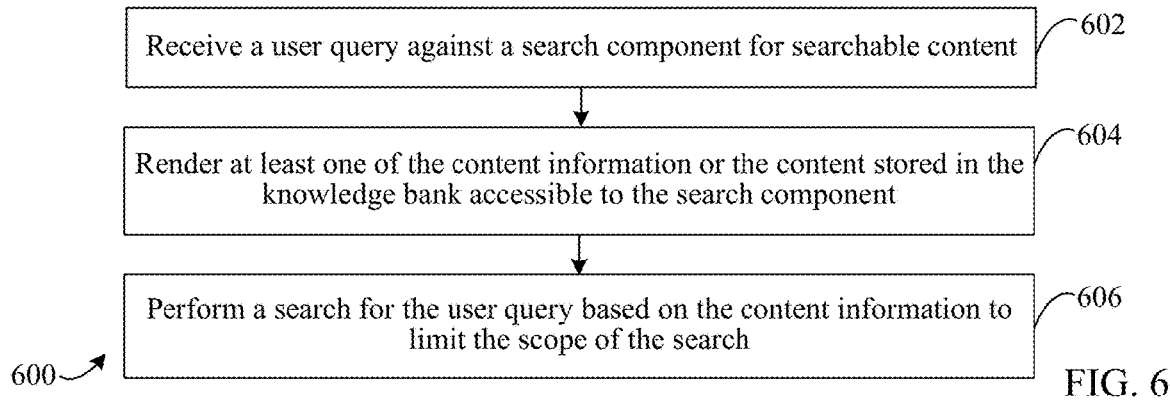
FIG. 6 shows a flowchart for directed analysis of content for storage and recall, according to an example embodiment.

Referring now to FIG. 6, a flowchart 600 for directed analysis of content for storage and recall is shown, according to an example embodiment. For purposes of illustration, flowchart 600 of FIG. 6 is described with respect to system 200 of FIG. 2 and its subcomponents, and also with reference to FIGS. 4, 5, and 7 (described below). That is, system 200 of FIG. 2 may perform various functions and operations in accordance with flowchart 600 for directed analysis of content for storage and recall. In embodiments, flowchart 600 may be a further embodiment of flowchart 300 of FIG. 3. Further structural and operational examples will be apparent to persons skilled in the relevant art(s) based on the following description. Flowchart 600 is described as follows.

In step 602, a user query against a search component for searchable content is received. As noted above with respect to step 310 of flowchart 300, a user search or query may be initiated in various ways using search components. In embodiments, search components may also include web-based search engines, such as Bing®, as well as interfaces therefor, such as a search field, e.g., field 428 of FIG. 4.

Figure 7:
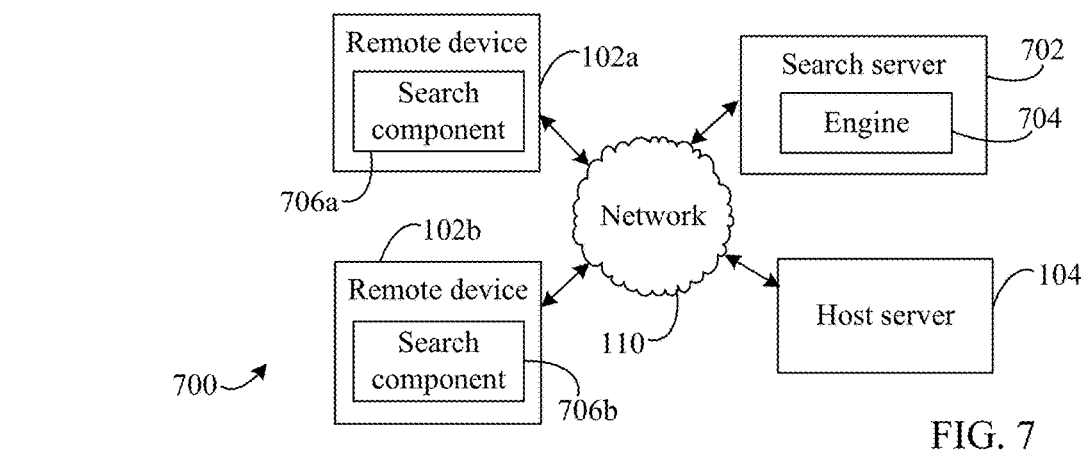
FIG. 7 shows a block diagram of a networked system for directed analysis of content for storage and recall, according to an example embodiment.

Referring also to FIG. 7, a block diagram of a networked system 700 for directed analysis of content for storage and recall is shown. System 700 may be a further embodiment of system 100 of FIG. 1. For example, as shown in FIG. 7, system 700 includes remote device 102*a*, remote device 102*b*, and host server 104, which may include components such as knowledge banks, content analysis logic, etc. (not shown for brevity and clarity), as described for FIG. 1, and communicate over a network 110, in the same or a similar manner as described above for FIG. 1. System 700 also includes a search server 702 comprising a search engine 704. Remote device 102*a* and remote device 102*b* each comprise a search component 706*a* and 706*b*, respectively. It should be noted that the number of remote devices and host servers is exemplary in nature, and may include more or fewer of each in various embodiments.

Search server 702 may comprise one or more server computers and may be one or more distributed or "cloud-based" servers, and may be a further embodiment of host server 104. That is, search server 702 may also be configured to receive user-selected content and/or content information from remote device 102*a* and/or remote device 102*b* via network 110, and in embodiments, search server 702 may also be configured to provide recalled content or search results to remote device 102*a* and/or remote device 102*b* via network 110 similarly as host server 104. That is, while not illustrated for brevity, search server 702 may include a knowledge bank and components such as, or similar to, operational logic 208, as described for FIG. 1.

As noted above, embodiments provide for search components to include web-based search engines, such as Bing®. Search engine 704 may be a web-based search engine such as Bing®, or any other search engine as would be under stood by one of skill in the relevant art(s) having the benefit of this disclosure. That is, search engine 704 may search Internet/web-based sites and/or data sources responsive to searches/queries from users. As an example, a user of remote device 102*a* may enter and initiate or execute a search or query via search component 706*a*, which may include search engine UIs such as those provided in web browsers, as well as interfaces therefor, such as a search filed, e.g., field 428 of FIG. 4.

In step 604, at least one of the content information or the content stored in the knowledge bank is rendered accessible to the search component. For example, knowledge bank(s) 224 may be rendered accessible to search engine 704 of search server 702. In embodiments, content information and/or content stored in knowledge bank(s) 224 is provided to search engine 704 when a user provides or executes a search/query. In such embodiments, API logic 222 may determine that the user is searching or querying via search engine 704 by interfacing with a search field, e.g., field 428 of FIG. 4, that is associated with a web browser, e.g., web browser UI 416, to monitor search activity, although API logic 222 may also be configured to monitor searches/queries made via interface 432 for a digital personal assistant. API logic 222 may then provide, or cause to be provided, content information for content stored in knowledge bank(s) 224 to search engine 704 of search server 702 that is relevant to the search/query of the user.

In some embodiments, content and content information stored in knowledge bank(s) 224 may be rendered accessible to search engine 704 of search server 702 such that search engine 704 may itself read and/or retrieve content and/or content information stored in knowledge bank(s) 224. For example, when a user executes a search that is received by search engine 704, search engine 704 may attempt to locate content and/or content information stored in knowledge bank(s) 224 prior to, or concurrently with, executing the search of the user. In these embodiments, search results that match or are related to the relevant content and/or content information may be prioritized for presenting to the user (e.g., are provided on the first page and/or at the top of the list of the results).

In step 606, a search is performed for the user query based on the content information to limit the scope of the search. For instance, search engine 704 (or processor 204 in embodiments), may perform searches of the user. Search results may be presented to the user, via display, in web browser UI 416 via field 428, knowledge bank UI 406, and/or interface 432, etc., of FIG. 4, as described herein.

As an example, in the scenario noted above regarding a search via a search engine for the word "bubble" by a user that is interested in computer programming/algorithms, when content and/or content information related to computer programming/algorithms is stored in a knowledge bank, the embodiments and techniques herein allow for search engine 704 to utilize this content and/or content information to refine the search results. That is, search engine 704 may limit the scope for the search to topics related to computers and programming, such as "bubble sort" operations, while eliminating, reducing, and/or deprioritizing topics for "bubble tea" as these are not of importance/relevance to the user based on the stored content and/or content information.

In embodiments, recall logic 212 may be configured to further refine search results and provide an indication of the searched-for content/information based on other content selected by another user or based on other content information stored in another knowledge bank of the other user that is related to the searched-for content. For example, recall logic 212 may provide indicia of content or provide search results based on page hits of a web page, temporal relevance of the web page, locational relevance of content of the web page, or content relevance of the web page, or based on content information for the web page stored in the other user's knowledge bank.

As noted herein, systems and components may be configured in various ways to perform their respective functions and operations. For example, content information that is associated with user selected content and stored in a knowledge bank may be determined according to various considerations.

Figure 8:
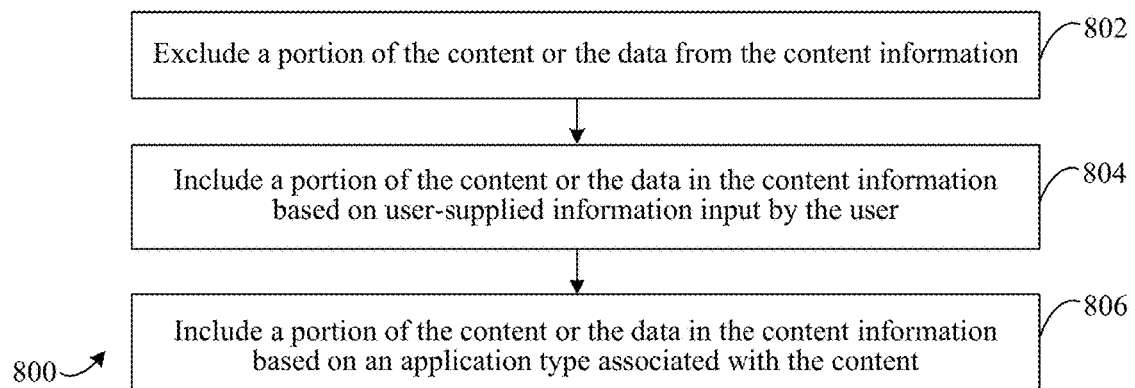
FIG. 8 shows a flowchart for directed analysis of content for storage and recall, according to an example embodiment.

In FIG. 8, a flowchart 800 for directed analysis of content for storage and recall is shown, according to an example embodiment. For purposes of illustration, flowchart 800 of FIG. 8 is described with respect to system 200 of FIG. 2 and its subcomponents, and also with reference to FIGS. 4 and 5. That is, system 200 of FIG. 2 may perform various functions and operations in accordance with flowchart 800 for directed analysis of content for storage and recall. In embodiments, flowchart 800 may be a further embodiment of flowchart 300 of FIG. 3, e.g., step 306. Further structural and operational examples will be apparent to persons skilled in the relevant art(s) based on the following description. According to embodiments, one or more steps of flowchart 800 may not be performed, or may be performed in alternate orders from the illustrated steps in FIG. 8. Flowchart 800 is described as follows.

In step 802, a portion of the content or the data is excluded from the content information. For instance, content analysis logic 210 of FIG. 2 may be configured to exclude portions of content or associated data when generating content information. Portions of content and associated data may be analyzed by content analysis logic 210, as described herein, and deemed of minimal importance or relevance to the content or to the user. For example, referring to FIG. 5 and selected line2 510 and line3 512, line1 508 may include a greeting addressing the recipient of the email, and if the recipient is the user, this information, while part of the content of the email message, may not be relevant to the selected lines (e.g., it contains implicit information: a greeting directed to the user) for purposes of providing the selected content back to the user during a recall operation.

As another example, one or more of the lines of the selected content portion of the body of the email may include a phrase such as " . . . , and by the way . . . " which may provide information unrelated to what the user desires to add to her knowledge bank. Such phrases may be determined as being of little relevance, and for exclusion from the content data, based on context of the content, including but not limited to, the other selected portions of the content, the subject of the email, etc. In such an example, assume line3 512 includes the text: "We plan to include features X, Y, and Z in the new widget before its release, and by the way, thank you for bringing coffee to the office this morning." While the user may be interested in adding this line to her knowledge base based on features X, Y, and Z being added by release time for the widget, the "thank you" for coffee may not be considered relevant.

In step 804, a portion of the content or the data is included in the content information based on user-supplied information input by the user. For instance, content analysis logic 210 of FIG. 2 may be configured to include portions of content or associated data when determining/generating content information based on user-supplied information. Portions of content and associated data may be analyzed by content analysis logic 210, as described herein, and deemed to be important or relevant to the content or to the user based on specific information that the user provides.

Extending the second example described above in step 802, the user may provide information as text or by voice that indicates, by way of example, "features," "X, Y, and Z," or "add to widget," and accordingly, content analysis logic 210 may weight related portions of the content and/or data associated with the content more heavily for inclusion in the content information. The user may also provide names of other persons involved with the widget release, when not included in the recipient list of the email, to provide an additional contextual reference for the content in the knowledge bank. The names may then be included in the content information, and may also be used for determining if other content and/or data is to be included in the content information.

In step 806, a portion of the content or the data is included in the content information based on an application type associated with the content. For instance, content analysis logic 210 of FIG. 2 may be configured to include portions of content or associated data when determining/generating content information based on the application type associated with the content. Portions of content and associated data may be analyzed by content analysis logic 210, as described herein, and deemed to be important or relevant to the content or to the user based on application type as different application present, format, and include data in specific ways.

For example, continuing the example described above in steps 802 and 804, email programs, such as Outlook®, provide information and data associated with email messages, e.g., subject lines, recipient fields, attachments, etc. Media and multimedia applications may include metadata specific to their respective, associated files, e.g., two files having the same image but at different resolutions, effects applied to the content of files that are specific to the type of application, e.g., a fade-in attribute for a slide of a presentation in PowerPoint® from Microsoft Corporation, and/or formats for files, e.g., formats for documents corresponding to different versions of Microsoft® Word. File extensions may be also be used for content information to provide context for recall of content. Including such data/information in the content information for selected content improves recall functionality as described herein.

It should be noted that the example embodiments described with respect to flowchart 800 are exemplary and non-limiting in nature, and that additional ways to determine/generate content information are contemplated herein, as would be understood by persons of skill in the relevant art(s) having the benefit of this disclosure.

Figure 9:
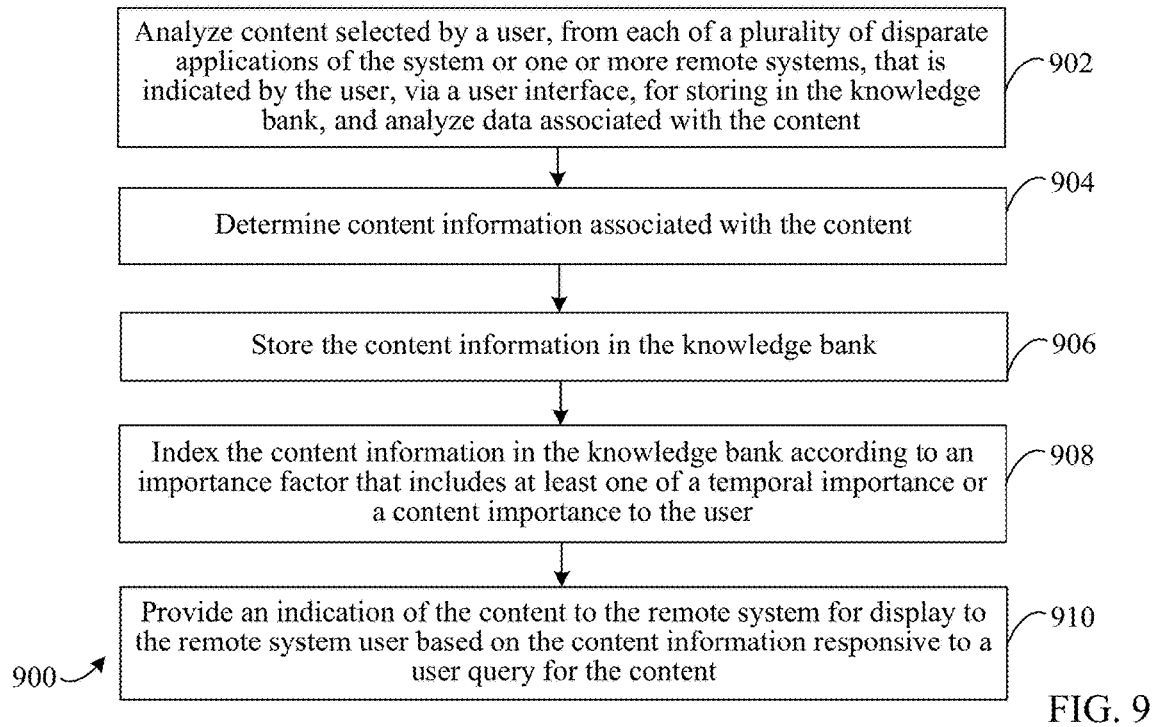
FIG. 9 shows a flowchart for directed analysis of content for storage and recall, according to an example embodiment.

In FIG. 9, a flowchart 900 for directed analysis of content for storage and recall is shown, according to an example embodiment. For purposes of illustration, flowchart 900 of FIG. 9 is described with respect to system 100 of FIG. 1 and system 200 of FIG. 2, along with their respective subcomponents. That is, system 200 of FIG. 2 may perform various functions and operations in accordance with flowchart 900 for directed analysis of content for storage and recall with regard to content selection/storage and recall between host server 104, remote device 102a and/or remote device 102b of system 100 shown in FIG. 1. Further structural and operational examples will be apparent to persons skilled in the relevant art(s) based on the following description. Flowchart 900 is described as follows.

In step 902, content selected by a user, from each of a plurality of disparate applications of the system or one or more remote systems, that is indicated by the user, via a user interface, is analyzed for storing in the knowledge bank, and data associated with the content is analyzed. For instance, content analysis logic 210 and/or analysis logic 108 may be configured to analyze selected content and other associated data, including metadata, for different applications of a system or systems remote to the system for adding to a knowledge bank, as similarly described above for step 306 of flowchart 300 in FIG. 3, and elsewhere herein. In embodiments, selected content that is analyzed may be from any application of any system with which a system of a user is communicatively coupled.

In an embodiment for step 902, system 200, as a further embodiment of host server 104 of FIG. 1, may receive content selected by a user of remote system 102*a*, as described in step 302 and/or step 304 of FIG. 3, as well as associated data for the content. Content analysis logic 108 of host server 104 then analyzes the content and data to determine content information therefor.

In step 904, content information associated with the content is determined. For instance, content analysis logic 210 and/or analysis logic 108 may be configured to determine the content information as described above for step 306 of flowchart 300 in FIG. 3, and elsewhere herein. Continuing with the example from step 902, when determining the content information, portions of content, associated data, and user-supplied information may be identified as important by content analysis logic 108 of host server 104, based on contextual analysis, content associations and/or similarities, knowledge of generalized topics, and/or the like, and determinations may be made based on content and/or content information previously stored in knowledge bank(s) 106.

In embodiments, host server 104 may include knowledge banks for a plurality of users in knowledge bank(s) 106. In this example, content analysis logic 108 of host server 104 may determine content information for content selected by the user based, at least in part, on content and content information in the knowledge bank of another user. In this way, the techniques and embodiments herein may leverage a larger base of data and information, e.g., "big data," for directed analysis of content for storage and recall to provide improved analysis and recall results. It is contemplated herein that leveraging the knowledge bank of another user is performed without the dissemination of confidential user information.

In step 906, the content information is stored in the knowledge bank. For instance, content analysis logic 210 and/or analysis logic 108 may be configured to store the determined content information in a knowledge bank of the user, e.g., knowledge bank(s) 224 and/or knowledge bank(s) 106, as similarly described above for step 308. The content information stored in step 906 may be any type of content information described and/or contemplated herein.

In embodiments, host server 104 may comprise large-volume storage components to store content information in knowledge bank(s) 106 for large amounts of added user content. The techniques and embodiments herein also provide for organization of knowledge banks to improve recall efficiency.

In step 908, the content information is indexed in the knowledge bank according to an importance factor that includes at least one of a temporal importance, a locational importance, or a content importance to the user. Knowledge bank(s) 224 and/or knowledge bank(s) 106 may be indexed to provide increased recall efficiency, reduce memory footprints for searches and storage, and reduce processor cycles/usage for recall and searching. Indexing of knowledge banks may be performed based on user identifiers, topics for content, temporality (including frequency), location, importance to the user, and/or the like.

For example, user-supplied information as described in step 304 of flowchart 300 in FIG. 3 may provide an indication of importance to the user or a tag for the content. This user-supplied information may be used to index the content and/or content information in the knowledge bank of the user. Because the knowledge banks described herein are user-driven, indexing these knowledge banks based on user-selected content and user-supplied information greatly enhances recall functions for specific content that is important to the user.

In step 910, an indication of the content is provided to the remote system for display to the remote system user based on the content information responsive to a user query for the content. For instance, a user may submit a query or search for content, and recall logic 212 may be configured to provide an indication of the content to the user as similarly described in step 310 of flowchart 300 in FIG. 3. The indication may be provided by recall logic 212 to a user system, e.g., remote device 102*a* or remote device 102*b*, based on content information associated with the content that is stored in knowledge bank(s) 224, and may be displayed via results field 430 of knowledge bank UI 406. In embodiments, an indication(s) of the content may be provided to the user system where a UI of the user system, as described herein, displays the indication(s) to the user, while other embodiments provide for the indication(s) to be generated by host server 104 and viewed via a UI of the user system that accesses host server 104. According to some embodiments, recall logic 212 may utilize API logic 214 in performance of operations described herein.

Figure 10:
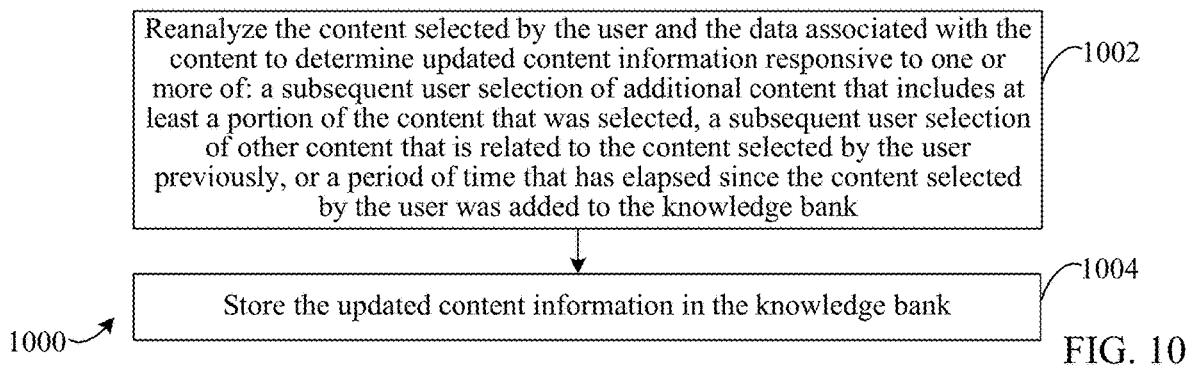
FIG. 10 shows flowchart for directed analysis of content for storage and recall, according to an example embodiment.

In FIG. 10, a flowchart 1000 for directed analysis of content for storage and recall is shown, according to an example embodiment. For purposes of illustration, flowchart 1000 of FIG. 10 is described with respect to system 200 of FIG. 2, along its subcomponents. That is, system 200 of FIG. 2 may perform various functions and operations in accordance with flowchart 1000 for directed analysis of content for storage and recall with regard to content selection/storage and recall between host server 104, remote device 102*a* and/or remote device 102*b* of system 100 shown in FIG. 1. Further structural and operational examples will be apparent to persons skilled in the relevant art(s) based on the following description. Flowchart 1000 is described as follows.

In step 1002, the content selected by the user and the data associated with the content are reanalyzed to determine updated content information responsive to one or more of: a subsequent user selection of additional content that includes at least a portion of the content that was selected, a subsequent user selection of other content that is related to the content selected by the user previously, or a period of time that has elapsed since the content selected by the user was added to the knowledge bank. For instance, content analysis logic 210 may be configured to reanalyze content previously selected by the user, along with the data associated with the content, to determine updated content information. That is, the techniques and embodiments herein provide for refinement of content and content information stored in knowledge banks over time. As an example, locations of businesses important to users, a user's acquaintances, and/or company personnel, may change over time. Similarly, users' interests, work projects, and/or work responsibilities may also change or become more refined. The techniques and embodiments here allow for changes to content and/or content information to also be changed and/or refined accordingly.

In embodiments, a subsequent user selection of additional content that includes at least a portion of the content that was selected may cause an activation of content analysis logic 210 to reanalyze the content, as described herein. Likewise, a subsequent user selection of other content that is related to the content selected by the user previously, or a period of time that has elapsed since the content selected by the user was added to the knowledge bank, may also cause the activation of content analysis logic 210 to reanalyze the content. Based on the reanalyzing of the content, updated content information may be determined and/or generated, as described herein.

Periods of time may be set by a user or may be set by, or be default within, system 200. Periods of time may be tracked by a timer (not shown) executing in system 200, e.g., on processor 204, and may be monitored by operational logic 208 or any component thereof. In embodiments, periods of time based on timers may run independently of user content selections being added to knowledge banks, and in such embodiments, system 200 may initiate a determination of whether or not to reanalyze any content at the end of each time period. In some embodiments, another, longer period of time, or multiple periods noted above, may be used to remove content and associated content information from a knowledge bank, thus providing an automated clean up feature.

In step 1004, the updated content information is stored in the knowledge bank. For instance, content analysis logic 210 may be configured to store the updated content information to knowledge bank(s) 224.

III. Example Mobile Device Implementation

Portions of system 100 of FIG. 1, system 200 of FIG. 2, system 400 of FIG. 4, UI 500 of FIG. 5, system 700 of FIG. 7, along with any components and/or subcomponents thereof, as well as the flowcharts described herein may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 11:
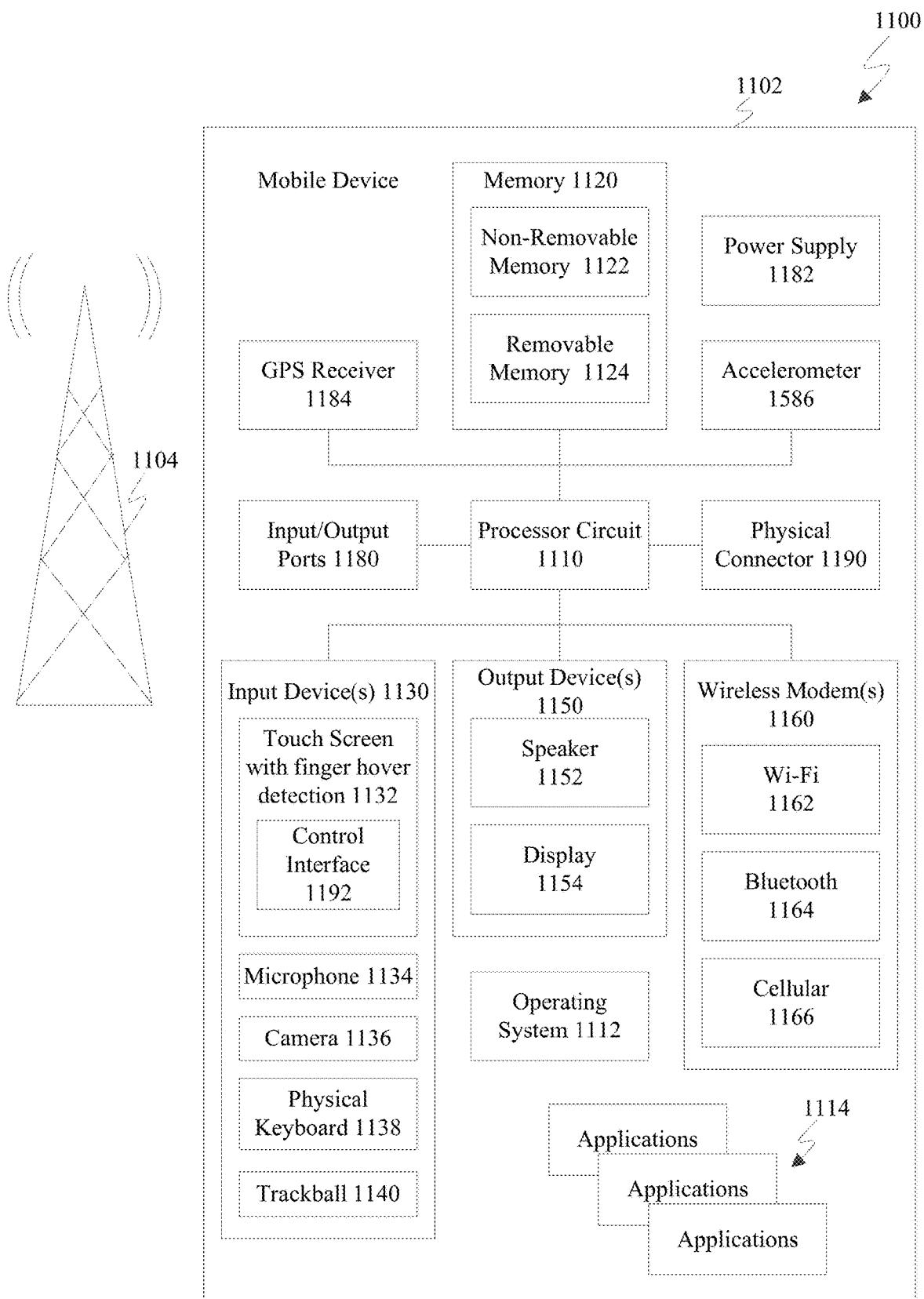
FIG. 11 shows a block diagram of an example mobile device that may be used to implement various example embodiments.

FIG. 11 is a block diagram of an exemplary mobile system 1100 that includes a mobile device 1102 that may implement embodiments described herein. For example, mobile device 1102 may be used to implement any system, client, or device, or components/subcomponents thereof, in the preceding sections. As shown in FIG. 11, mobile device 1102 includes a variety of optional hardware and software components. Any component in mobile device 1102 can communicate with any other component, although not all connections are shown for ease of illustration. Mobile device 1102 can be any of a variety of computing devices (e.g., cell phone, smart phone, handheld computer, Personal Digital Assistant (PDA), etc.) and can allow wireless two-way communications with one or more mobile communications networks 1104, such as a cellular or satellite network, or with a local area or wide area network.

Mobile device 1102 can include a controller or processor 1110 (e.g., signal processor, microprocessor, ASIC, or other control and processing logic circuitry) for performing such tasks as signal coding, data processing, input/output processing, power control, and/or other functions. An operating system 1112 can control the allocation and usage of the components of mobile device 1102 and provide support for one or more application programs 1114 (also referred to as "applications" or "apps"). Application programs 1114 may include common mobile computing applications (e.g., e-mail applications, calendars, contact managers, web browsers, messaging applications) and any other computing applications (e.g., word processing applications, mapping applications, media player applications).

Mobile device 1102 can include memory 1120. Memory 1120 can include non-removable memory 1122 and/or removable memory 1124. Non-removable memory 1122 can include RAM, ROM, flash memory, a hard disk, or other well-known memory devices or technologies. Removable memory 1124 can include flash memory or a Subscriber Identity Module (SIM) card, which is well known in GSM communication systems, or other well-known memory devices or technologies, such as "smart cards." Memory 1120 can be used for storing data and/or code for running operating system 1112 and application programs 1114. Example data can include web pages, text, images, sound files, video data, or other data to be sent to and/or received from one or more network servers or other devices via one or more wired or wireless networks. Memory 1120 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

A number of programs may be stored in memory 1120. These programs include operating system 1112, one or more application programs 1114, and other program modules and program data. Examples of such application programs or program modules may include, for example, computer program logic (e.g., computer program code or instructions) for implementing, atomic deployment manager 102, host server 104, atomic deployment manager 102, end user client 204, distribution host 206, a developer client 210, OS 304, UI 306, main application(s) 308, related optional applications 310, atomic deployment manager 312, end user client 1802, process 1804, optional package change listener 1806, distribution host 1816, in-use handler 1818, UI component 1904, version determiner 1906, atomic set generator 1908, bundler 1910, SDK 1912, flowchart 600, flowchart 700 flowchart 900, flowchart 1000, flowchart 1100, flowchart 1200, flowchart 1400, flowchart 1500, flowchart 1600, flowchart 1700, flowchart 2000 (including any suitable step of flowcharts 600, 700, 900, 1000, 1100, 1200, 1400, 1500, 1600, 1700, and 2000), and/or further examples described herein.

Mobile device 1102 can support one or more input devices 1130, such as a touch screen 1132, a microphone 1134, a camera 1136, a physical keyboard 1138 and/or a trackball 1140 and one or more output devices 1150, such as a speaker 1152 and a display 1154. Other possible output devices (not shown) can include piezoelectric or other haptic output devices. Some devices can serve more than one input/output function. For example, touch screen 1132 and display 1154 can be combined in a single input/output device. Input devices 1130 can include a Natural User Interface (NUI).

Wireless modem(s) 1160 can be coupled to antenna(s) (not shown) and can support two-way communications between processor 1110 and external devices, as is well understood in the art. Modem(s) 1160 are shown generically and can include a cellular modem 1166 for communicating with the mobile communication network 1104 and/or other radio-based modems (e.g., Bluetooth 1164 and/or Wi-Fi 1162). At least one of wireless modem(s) 1160 is typically configured for communication with one or more cellular networks, such as a GSM network for data and voice communications within a single cellular network, between cellular networks, or between the mobile device and a public switched telephone network (PSTN).

Mobile device 1102 can further include at least one input/output port 1180, a power supply 1182, a satellite navigation system receiver 1184, such as a Global Positioning System (GPS) receiver, an accelerometer 1186, and/or a physical connector 1190, which can be a USB port, IEEE 1394 (FireWire) port, and/or RS-232 port. The illustrated components of mobile device 1102 are not required or all-inclusive, as any components can be deleted and other components can be added as would be recognized by one skilled in the art.

In an embodiment, mobile device 1102 is configured to implement any of the above-described features of flowcharts herein. Computer program logic for performing any of the operations, steps, and/or functions described herein may be stored in memory 1120 and executed by processor 1110.

IV. Example Processor-Based Computer System Implementation

As noted herein, the embodiments and techniques described herein may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC) or ASIC.

Figure 12:
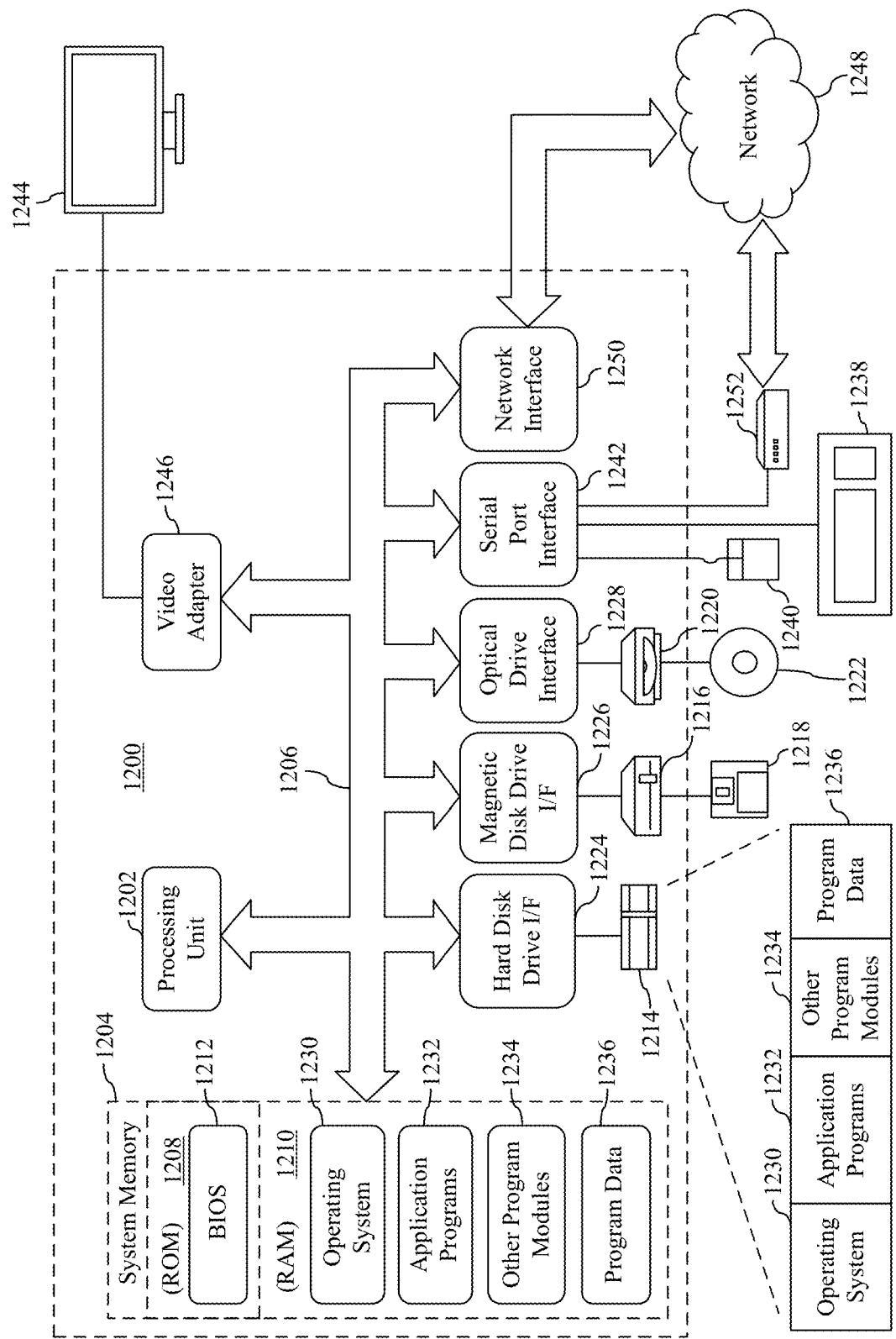
FIG. 12 shows a block diagram of an example processor-based computer system that may be used to implement various example embodiments.

FIG. 12 depicts an example processor-based computer system 1200 that may be used to implement various example embodiments described herein. For example, system 1200 may be used to implement any server, host, system, device (e.g., a remote device), mobile/personal device, etc., as described herein. System 1200 may also be used to implement any of the steps of any of the flowcharts, as described herein. The description of system 1200 provided herein is provided for purposes of illustration, and is not intended to be limiting. Embodiments may be implemented in further types of computer systems, as would be known to persons skilled in the relevant art(s).

As shown in FIG. 12, system 1200 includes a processing unit 1202, a system memory 1204, and a bus 1206 that couples various system components including system memory 1204 to processing unit 1202. Processing unit 1202 may comprise one or more circuits, microprocessors or microprocessor cores. Bus 1206 represents one or more of any of several types of bus structures, including a memory bus or memory controller, a peripheral bus, an accelerated graphics port, and a processor or local bus using any of a variety of bus architectures. System memory 1204 includes read only memory (ROM) 1208 and random access memory (RAM) 1210. A basic input/output system 1212 (BIOS) is stored in ROM 1208.

System 1200 also has one or more of the following drives: a hard disk drive 1214 for reading from and writing to a hard disk, a magnetic disk drive 1216 for reading from or writing to a removable magnetic disk 1218, and an optical disk drive 1220 for reading from or writing to a removable optical disk 1222 such as a CD ROM, DVD ROM, BLU-RAY™ disk or other optical media. Hard disk drive 1214, magnetic disk drive 1216, and optical disk drive 1220 are connected to bus 1206 by a hard disk drive interface 1224, a magnetic disk drive interface 1226, and an optical drive interface 1228, respectively. The drives and their associated computer-readable media provide nonvolatile storage of computer-readable instructions, data structures, program modules and other data for the computer. Although a hard disk, a removable magnetic disk and a removable optical disk are described, other types of computer-readable memory devices and storage structures can be used to store data, such as flash memory cards, digital video disks, random access memories (RAMs), read only memories (ROM), and the like.

A number of program modules may be stored on the hard disk, magnetic disk, optical disk, ROM, or RAM. These program modules include an operating system 1230, one or more application programs 1232, other program modules 1234, and program data 1236. In accordance with various embodiments, the program modules may include computer program logic that is executable by processing unit 1202 to perform any or all of the functions and features of any technique or embodiment described herein, including computer program logic. The program modules may also include computer program logic that, when executed by processing unit 1202, causes processing unit 1202 to perform any of the steps of any of the flowcharts, as described above.

A user may enter commands and information into system 1200 through input devices such as a keyboard 1238 and a pointing device 1240 (e.g., a mouse). Other input devices (not shown) may include a microphone, joystick, game controller, scanner, camera, or the like. In one embodiment, a touch screen is provided in conjunction with a display 1244 to allow a user to provide user input via the application of a touch (as by a finger or stylus for example) to one or more points on the touch screen. These and other input devices are often connected to processing unit 1202 through a serial port interface 1242 that is coupled to bus 1206, but may be connected by other interfaces, such as a parallel port, game port, or a universal serial bus (USB). Such interfaces may be wired or wireless interfaces.

Display 1244 is connected to bus 1206 via an interface, such as a video adapter 1246. In addition to display 1244, system 1200 may include other peripheral output devices (not shown) such as speakers and printers.

System 1200 is connected to a network 1248 (e.g., a local area network or wide area network such as the Internet) through a network interface 1250, a modem 1252, or other suitable means for establishing communications over the network. Modem 1252, which may be internal or external, is connected to bus 1206 via serial port interface 1242.

As used herein, the terms "computer program medium," "computer-readable medium," and/or "computer-readable storage medium" are used to generally refer to memory devices or storage structures such as the hard disk associated with hard disk drive 1214, removable magnetic disk 1218, removable optical disk 1222, as well as other memory devices or storage structures such as flash memory cards, digital video disks, random access memories (RAMs), read only memories (ROM), and the like. Such computer-readable media/storage media are distinguished from and non-overlapping with communication media, software programs, and transitory signals (do not include communication media, software programs, or transitory signals). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Example embodiments herein are also directed to such communication media.

As noted above, computer programs and modules (including application programs 1232 and other program modules 1234) may be stored on the hard disk, magnetic disk, optical disk, ROM, or RAM. Such computer programs may also be received via network interface 1250, serial port interface 1242, or any other interface type. Such computer programs, when executed or loaded by an application, enable systems to implement features of embodiments discussed herein. Accordingly, such computer programs represent controllers of the system 1200. Embodiments are also directed to computer program products comprising software stored on any computer useable medium. Such software, when executed in one or more data processing devices, causes a data processing device(s) to operate as described herein. Embodiments may employ any computer-useable or computer-readable medium, known now or in the future. Embodiments of computer-readable mediums include, but are not limited to memory devices and storage structures such as RAM, hard drives, floppy disks, CD ROMs, DVD ROMs, zip disks, tapes, magnetic storage devices, optical storage devices, MEMs, nanotechnology-based storage devices, and the like.

V. Additional Example Advantages and Embodiments

As described, systems and devices embodying the techniques herein may be configured in various ways to perform their respective functions. In embodiments, one or more of the steps or operations of any flowchart described herein may not be performed. Moreover, steps or operations in addition to or in lieu of those in any flowchart described herein may be performed. Further, in examples, one or more operations of any flowchart described herein may be performed out of order, in an alternate sequence, or partially (or completely) concurrently with each other or with other operations.

The embodiments and techniques described herein provide improved performance of computing devices and operations executing thereon for directed analysis of content for storage and recall. For instance, the described embodiments and techniques provide for increased system and device efficiency, e.g., faster searching and results for content recall via user-driven knowledge banks and indexing of the knowledge banks, as described herein. Additionally, the scope of system searches is reduced for content that is important to the user at least because content across multiple, disparate applications is accumulated by the knowledge banks. Accordingly, fewer processing cycles are required by the system in performing content search and recall operations, and system memory for searches is thus freed more quickly because searches are more efficient, thus reducing the required memory footprint.

The additional examples described in this Section may be applicable to examples disclosed in any other Section or subsection of this disclosure.

A system is described herein. The system may be for directed analysis of content for storage and recall using user-driven knowledge banks according to embodiments. The system includes at least one memory configured to store program instructions for analyzing content and search recall, and at least one processor configured to execute the program instructions. The program instructions include content capture instructions configured to accept content selected by a user, from each of a plurality of disparate applications of the system, that is indicated by the user for addition to at least one of a local knowledge bank or a remote knowledge bank. The program instructions also include content analysis instructions configured to store content information about the content in one or more of the local knowledge bank or the remote knowledge bank, the content information comprising at least one of an application name, a name of a person, a date, a time, a context, or a keyword. The program instructions include recall instructions configured to provide an indication of the content to a user based on the content information responsive to a user query.

In an embodiment, the system also includes the local knowledge bank, and the content information is stored in the local knowledge bank based on to an importance factor that includes at least one of a temporal importance, a locational importance, or a content importance to the user.

In an embodiment of the system, the content capture instructions are configured to perform at least one of accept the content selected by the user via voice command, accept the content selected by the user, via a UI that is displayed by the system, and responsive to designating the content in the UI by the user, or accept the content selected by the user, via a first UI that is displayed by the system, and responsive to designating the content in a second UI that is displayed by the system by the user and to one or more actions of the user including.

In an embodiment of the system, at least one of the content information or the content stored in the knowledge bank is rendered accessible to the search component. In the embodiment, the search component may be one of a search engine, a digital personal assistant, or a search application executing on the system, and the content information may limit the scope of results for the user query.

In an embodiment of the system, at least one of the content capture instructions, the content analysis instructions, or the recall instructions comprise a portion of an application programming interface (API) configured to interact with the plurality of disparate applications of the system.

In an embodiment of the system, the content analysis instructions are configured to analyze the content and data associated with the content to determine the content information. The analyzing may include at least one of excluding a portion of the content or the data from the content information, including a portion of the content or the data in the content information based on user-supplied information input by the user, or including a portion of the content or the data in the content information based on an application type associated with the content.

In an embodiment of the system, the content capture instructions are configured to receive user-supplied information input by the user that is associated with the content selected by the user, and the content analysis instructions are configured to store the received user-supplied information as part of the content information.

Another system is also described herein. The system may be for directed analysis of content for storage and recall using user-driven knowledge banks according to embodiments. The system includes at least one memory configured to store a knowledge bank and program instructions for analyzing content and search recall, and at least one processor configured to execute the program instructions. The program instructions include content analysis instructions configured to analyze content selected by a user, from each of a plurality of disparate applications of the system or one or more remote systems, that is indicated by the user via a user interface, for storing in the knowledge bank, and analyze data associated with the content to determine content information associated with the content, and to store the content information in the knowledge bank. The program instructions also include recall instructions configured to provide an indication of the content to one of the one or more remote systems for display to the user based on the content information responsive to a user query.

In an embodiment of the system, the user query is performed by a search component comprising one of a digital personal assistant executing on the one of the one or more remote systems or a search application executing on the one of the one or more remote systems.

In an embodiment of the system, the content analysis instructions are configured to determine the content information based at least in part on prior content or prior content information previously stored in the knowledge bank.

In an embodiment of the system, the knowledge bank is linked to credentials of the user, the knowledge bank also stores information about the user, and at least one of the content analysis instructions or the recall instructions are configured to automatically, based on the credentials, utilize the information about the user to analyze the content or provide the indication of the content, respectively.

In an embodiment of the system, the content analysis instructions are configured to receive a user query from one of the one or more remote systems against a search component for searchable content, and at least one of the content information or the content stored in the knowledge bank is rendered accessible to the search component.

In an embodiment of the system, the recall instructions are configured to provide the indication of the content based on at least one of other content selected by another user or other content information stored in another knowledge bank of the other user, the other content being related to the content.

In an embodiment of the system, the other content comprises web page content, and the other content or other content information is utilized by the recall instructions based on one or more of page hits of the web page, temporal relevance of the web page, locational relevance of content of the web page, or content relevance of the web page.

In an embodiment of the system, the content analysis instructions are configured to reanalyze the content selected by the user and the data associated with the content to determine updated content information responsive to one or more of a subsequent user selection of additional content that includes at least a portion of the content that was selected, a subsequent user selection of other content that is related to the content selected by the user previously, or a period of time that has elapsed since the content selected by the user was added to the knowledge bank. In the embodiment, the content analysis instructions are also configured to store the updated content information in the knowledge bank.

In an embodiment of the system, the content analysis instructions are configured to index the content information in the knowledge bank according to an importance factor that includes at least one of a temporal importance, a locational importance, or a content importance to the user.

A method implemented by computing system is described herein. The method may be for directed analysis of content for storage and recall using user-driven knowledge banks according to embodiments. The method includes analyzing a plurality of content items selected by a user, from each of a plurality of disparate applications, respectively, of one or more computing systems, that is indicated by the user for storing in a knowledge bank, and analyzing data associated with each of the plurality of content items. The method also includes determining respective content information associated with each of the plurality of content items, storing the respective content information in the knowledge bank, and providing individual indications for each of the plurality of content for display to the user based on the respective content information responsive to associated user queries.

In an embodiment of the method, the plurality of content items are retrieved in the method via an application programming interface (API) from the plurality of disparate applications, and the providing is performed using the API.

In an embodiment of the method, one or more of the associated user queries or indicia thereof comprises a natural language representative of a search requested by the user.

VI. Conclusion

While various examples of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described examples, but should be defined only in accordance with the following claims and their equivalents.

What is claimed is:
1. A system comprising:
 at least one memory configured to store:
  program instructions for analyzing content and search recall; and
 at least one processor configured to execute the program instructions, the program instructions comprising:
  content capture instructions configured to:
   accept, via a first user interface (UI) of the system, content from each of a plurality of disparate applications of the system,
    the content selected by a user for addition to at least one of a local knowledge bank or a remote knowledge bank from respective second UIs of the plurality of disparate applications that are displayed by the system, and
    the content accepted in the first UI, that is displayed by the system, via an application programming interface (API) call that retrieves the content that is selected responsive to one or more actions of the user associated with the first UI;
  content analysis instructions configured to:
   store content information about the content in one or more of the local knowledge bank or the remote knowledge bank, the content information comprising at least one of an application name, a name of a person, a date, a time, a context, or a keyword; and recall instructions configured to:
provide an indication of the content to a user based on the content information responsive to a user query.

2. The system of claim 1, further comprising:
the local knowledge bank;
wherein the content information is stored in the local knowledge bank based on an importance factor that includes at least one of a temporal importance, a locational importance, or a content importance to the user.

3. The system of claim 1, wherein the content capture instructions are configured to perform at least one of:
accept the content selected by the user via voice command.

4. The system of claim 1, wherein
at least one of the content information or the content stored in the knowledge bank is rendered accessible to the search component.

5. The system of claim 4, wherein the search component is one of a search engine, a digital personal assistant, or a search application executing on the system; and
wherein the content information limits the scope of results for the user query.

6. The system of claim 1, wherein at least one of the content capture instructions, the content analysis instructions, or the recall instructions comprise a portion of the API that is configured to interact with the plurality of disparate applications of the system.

7. The system of claim 1, wherein the content analysis instructions are configured to:
analyze the content and data associated with the content to determine the content information, the analyzing including at least one of:
excluding a portion of the content or the data from the content information,
including a portion of the content or the data in the content information based on user-supplied information input by the user, or
including a portion of the content or the data in the content information based on an application type associated with the content.

8. The system of claim 1, wherein the content capture instructions are configured to receive user-supplied information input by the user that is associated with the content selected by the user; and
wherein the content analysis instructions are configured to store the received user-supplied information as part of the content information.

9. A system comprising:
at least one memory configured to store:
a knowledge bank; and
program instructions for analyzing content and search recall; and
at least one processor configured to execute the program instructions, the program instructions comprising:
content analysis instructions configured to:
analyze content selected by a user, from each of a plurality of disparate applications of the system or one or more remote systems, that is indicated by the user via a user interface, for storing in the knowledge bank, and analyze data associated with the content to determine content information associated with the content;
store the content information in the knowledge bank; and
index the content information stored in the knowledge bank according to an importance factor that includes at least one of a temporal importance, a locational importance, or a content importance to the user; and
recall instructions configured to:
provide an indication of the content to one of the one or more remote systems for display to the user responsive to a user query for the content, the user query being performed based at least in part on the content information that was stored and indexed in the knowledge bank.

10. The system of claim 9, wherein the user query is performed by a search component comprising one of a digital personal assistant executing on the one of the one or more remote systems or a search application executing on the one of the one or more remote systems.

11. The system of claim 9, wherein the content analysis instructions are configured to determine the content information based at least in part on prior content or prior content information previously stored in the knowledge bank.

12. The system of claim 9, wherein the knowledge bank is linked to credentials of the user;
wherein the knowledge bank also stores information about the user; and
wherein at least one of the content analysis instructions or the recall instructions are configured to automatically, based on the credentials, utilize the information about the user to analyze the content or provide the indication of the content, respectively.

13. The system of claim 9, wherein the content analysis instructions are configured to receive a user query from one of the one or more remote systems against a search component for searchable content; and
wherein at least one of the content information or the content stored in the knowledge bank is rendered accessible to the search component.

14. The system of claim 13, wherein the recall instructions are configured to provide the indication of the content based on at least one of other content selected by another user or other content information stored in another knowledge bank of the other user, the other content being related to the content.

15. The system of claim 14, wherein the other content comprises web page content; and
wherein the other content or other content information is utilized by the recall instructions based on one or more of page hits of the web page, temporal relevance of the web page, locational relevance of content of the web page, or content relevance of the web page.

16. The system of claim 9, wherein the content analysis instructions are configured to:
reanalyze the content selected by the user and the data associated with the content to determine updated content information responsive to one or more of:
a subsequent user selection of additional content that includes at least a portion of the content that was selected;
a subsequent user selection of other content that is related to the content selected by the user previously; or
a period of time that has elapsed since the content selected by the user was added to the knowledge bank; and
store the updated content information in the knowledge bank.

17. A method implemented by a computing system, the method comprising:
analyzing a plurality of content items, that are indicated by a user for storing in a knowledge bank selected by the user via a first user interface (UI) of the computing system, from UIs of each of a plurality of disparate applications, respectively, of one or more computing systems;

analyzing data associated with each of the plurality of content items;

determining respective content information associated with each of the plurality of content items;

storing the respective content information in the knowledge bank;

indexing the content information stored in the knowledge bank according to an importance factor that includes at least one of a temporal importance, a locational importance, or a content importance to the user; and providing individual indications for each of the plurality of content items for display to the user responsive to associated user queries for the content items, the user queries being performed based at least in part on the content information that was stored and indexed in the knowledge bank.

18. The method of claim 17, wherein the plurality of content items are retrieved in the method via an application programming interface (API) from the plurality of disparate applications; and wherein the providing is performed using the API.

19. The method of claim 18, wherein one or more of the associated user queries or indicia thereof comprises a natural language representative of a search requested by the user.

20. The method of claim 17, further comprising:

determining at least a portion of the respective content information based at least in part on prior content or prior content information previously stored in the knowledge bank.

* * * * *